United States Patent
Kanno

(10) Patent No.: US 11,748,012 B2
(45) Date of Patent: *Sep. 5, 2023

(54) MEMORY SYSTEM AND METHOD FOR CONTROLLING NONVOLATILE MEMORY

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,399

(22) Filed: Apr. 14, 2022

(65) Prior Publication Data

US 2022/0244854 A1 Aug. 4, 2022

Related U.S. Application Data

(63) Continuation of application No. 16/564,364, filed on Sep. 9, 2019, now Pat. No. 11,334,266.

(30) Foreign Application Priority Data

Jan. 29, 2019 (JP) .................................. 2019-013221

(51) Int. Cl.
- *G06F 3/06* (2006.01)
- *G06F 9/50* (2006.01)

(Continued)

(52) U.S. Cl.
CPC ............ *G06F 3/064* (2013.01); *G06F 3/0614* (2013.01); *G06F 3/0659* (2013.01);

(Continued)

(58) Field of Classification Search
CPC ...... G06F 3/064; G06F 3/0614; G06F 3/0659; G06F 3/0679; G06F 9/5016; G06F 12/0246; G06F 12/0623; G06F 13/1668
See application file for complete search history.

(56) References Cited

U.S. PATENT DOCUMENTS 10,055,159 B2 8/2018 Choi et al.
2009/0259800 A1* 10/2009 Kilzer ................. G06F 12/0246
711/E12.008

(Continued)

FOREIGN PATENT DOCUMENTS

JP 2017-162067 A 9/2017

OTHER PUBLICATIONS

Neal Mielke, et al., "Recovery Effects in the Distributed Cycling of Flash Memories", 2006 IEEE Proceedings, 44th Annual International Reliability Physics Symposium, 2006, pp. 29-35.

(Continued)

*Primary Examiner* — Kalpit Parikh
(74) *Attorney, Agent, or Firm* — Oblon, McClelland, Maier & Neustadt, L.L.P.

(57) ABSTRACT

According to one embodiment, when receiving a write command including a first identifier of identifiers for accessing regions from a host, a memory system allocates one block of a common free block group shared by the regions as a write destination block for the region corresponding to the first identifier. When receiving a copy command including a block address of a copy source block of blocks belonging to the region corresponding to the first identifier, and an identifier of a copy destination target region indicative of the first identifier from the host, the memory system allocates one block as a copy destination block for the region corresponding to the first identifier, and copies data from the copy source block to the copy destination block.

18 Claims, 21 Drawing Sheets

(51) Int. Cl.
*G06F 12/02* (2006.01)
*G06F 12/06* (2006.01)
*G06F 13/16* (2006.01)

(52) U.S. Cl.
CPC .......... *G06F 3/0679* (2013.01); *G06F 9/5016* (2013.01); *G06F 12/0246* (2013.01); *G06F 12/0623* (2013.01); *G06F 13/1668* (2013.01); *G06F 2212/7202* (2013.01)

(56) References Cited

U.S. PATENT DOCUMENTS

| | | |
|---|---|---|
| 2016/0313943 A1 | 10/2016 | Hashimoto |
| 2016/0321010 A1 | 11/2016 | Hashimoto |
| 2017/0262176 A1 | 9/2017 | Kanno |
| 2017/0262365 A1 | 9/2017 | Kanno |
| 2018/0024775 A1 | 1/2018 | Miller |
| 2018/0239698 A1 | 8/2018 | Fukutomi et al. |

OTHER PUBLICATIONS

Yiying Zhang, et al., "De-indirection for Flash-based SSDs with Nameless Writes", 10th USENIX Conference on File and Storage Technologies (FAST '12), 2012, pp. 1-16, https://www.usenix.org/system/files/conference/fast12/zhang.pdf.

* cited by examiner

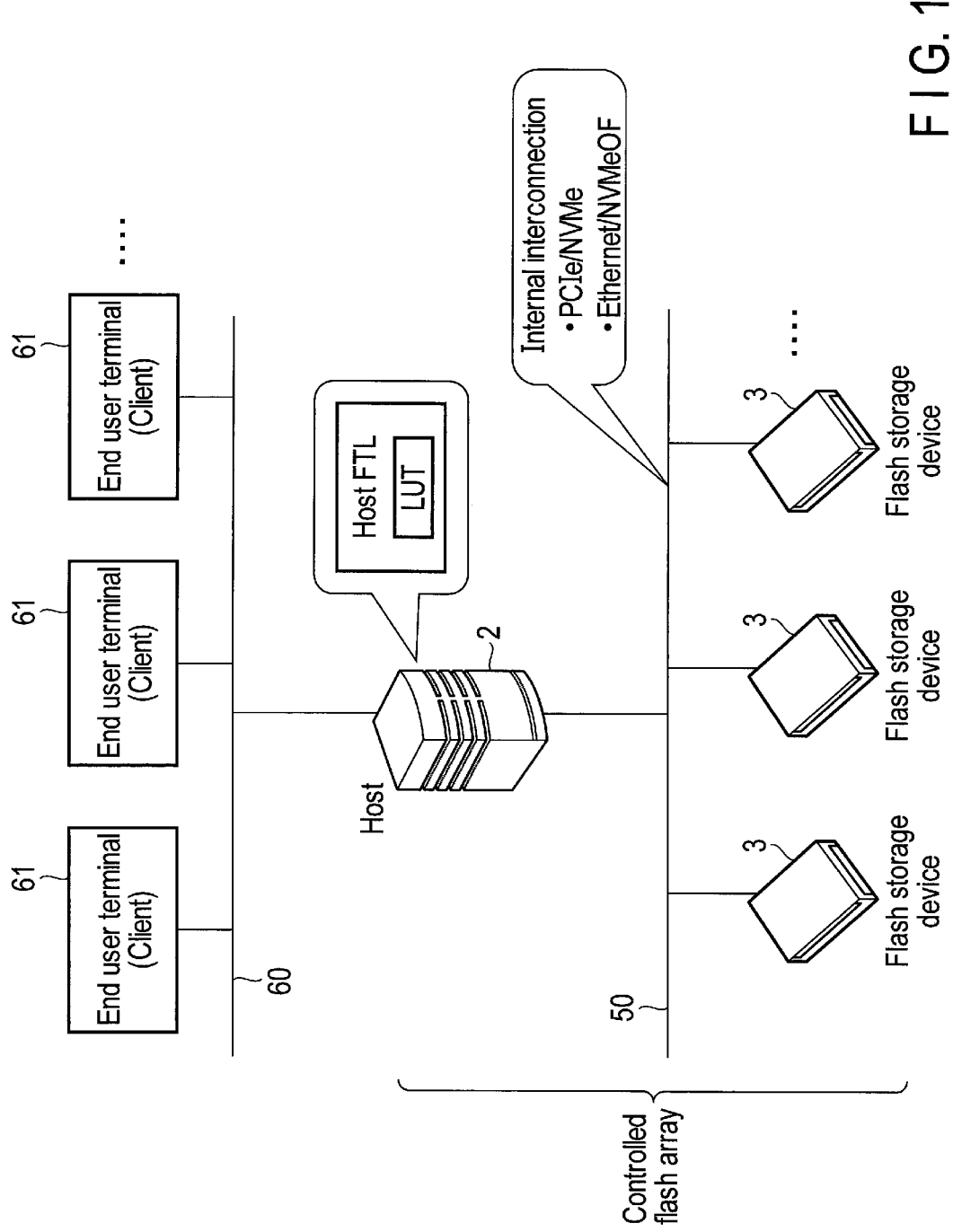
F I G. 1

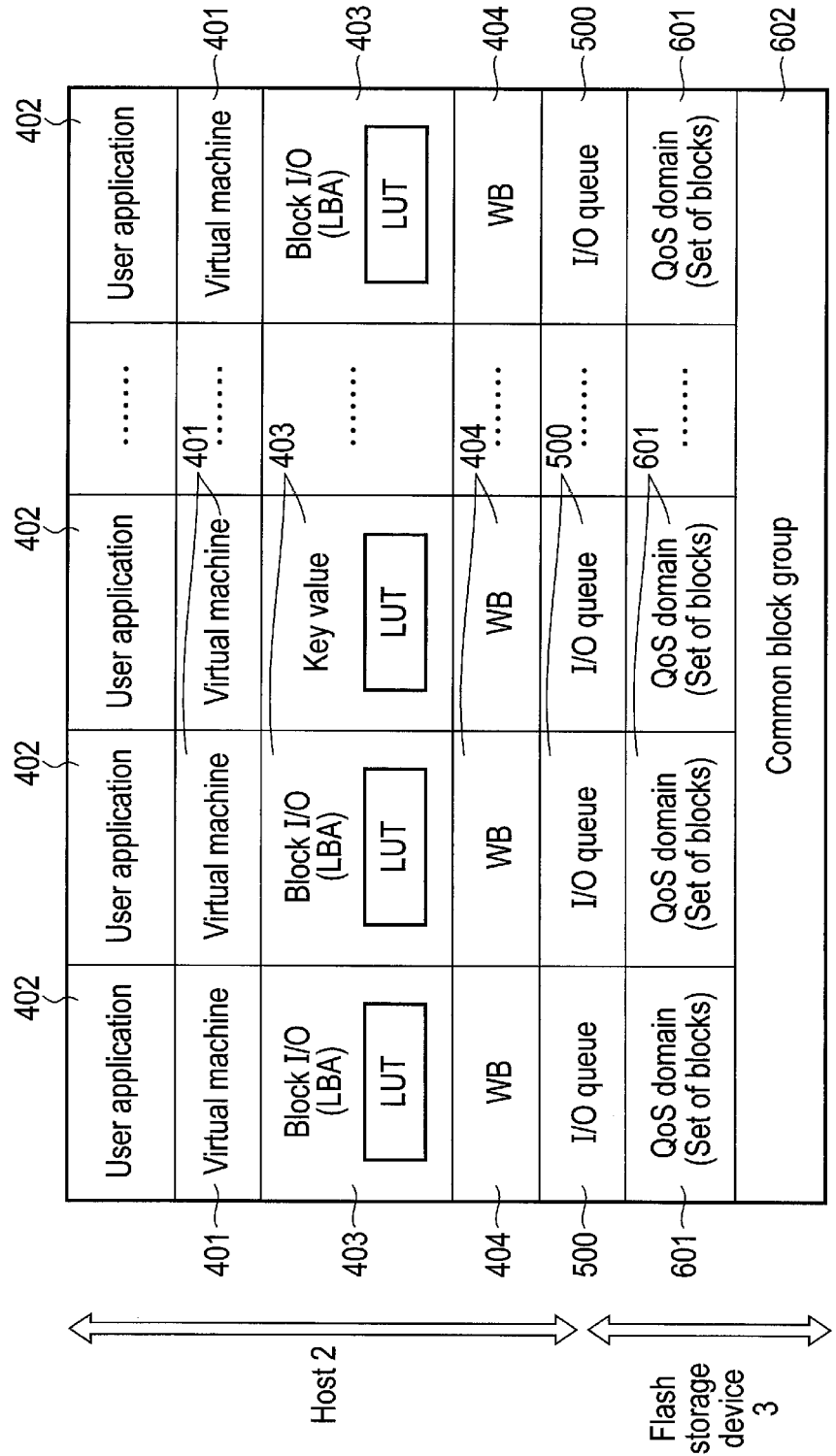
F I G. 2

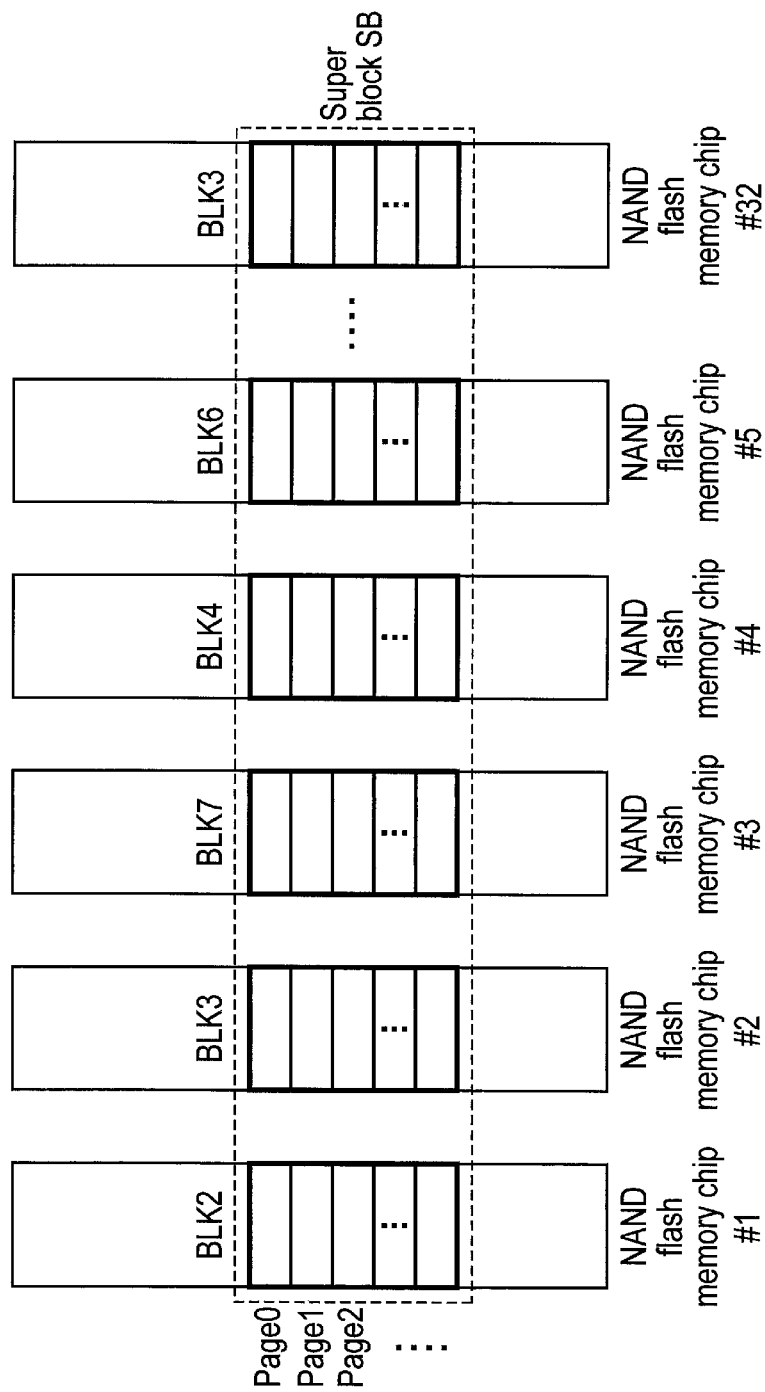
F I G. 5

QoS domain create command

| | Descriptions |
|---|---|
| Command ID | Command ID of QoS domain create command |
| QoS domain ID | Identifier of QoS domain to be created |
| Capacity | Capacity of QoS domain to be created |

F I G. 6

Write command

| | Descriptions |
|---|---|
| Command ID | Command ID of write command |
| QoS domain ID | Identifier of QoS domain to which data is to be written |
| Tag | Identifier of data to be written (for example, LBA, key of key-value store, hash value of key, etc.) |
| Length | Length of data to be written |
| Write buffer address | Location in write buffer in which data to be written is stored |

F I G. 7

Address record request

| | Descriptions |
|---|---|
| QoS domain ID | Identifier of QoS domain to which data is to be written |
| Tag | Identifier of data to be written (for example, LBA, key of key-value store, hash value of key, etc.) |
| Physical address | Physical address indicates physical storage location to which data is written.<br>Physical address is represented by block address and offset. |
| Length | Length of written data |

F I G. 8

Read command

| | Descriptions |
|---|---|
| Command ID | Command ID of read command |
| QoS domain ID | Identifier of QoS domain to which data to be read is stored |
| Physical address | Physical address indicates physical storage location in which data to be read is stored.<br>Physical address is represented by block address and offset. |
| Length | Length of data to be read |
| Read buffer address | Location in read buffer to which data is to be transferred |

F I G. 9

Copy command

| | Descriptions |
|---|---|
| Command ID | Command ID of copy command |
| Source QoS domain ID | Identifier of copy source QoS domain |
| Source physical address | Block address of copy source block |
| Destination QoS domain ID | Identifier of copy destination QoS domain |

F I G. 10

Set valid map command

| | Descriptions |
|---|---|
| Command ID | Command ID of set valid map command |
| Source QoS domain ID | Identifier of copy source QoS domain |
| Source physical address | Block address of copy source block |
| Bit map | Bit map indicates whether each data stored in copy source block is valid data or invalid data. |

F I G. 11

Address change request

| | Descriptions |
|---|---|
| Old QoS domain ID | Identifier of copy source QoS domain |
| Tag | Identifier of copied data<br>(Address change request includes plurality of tags when plurality of data portions are copied.) |
| Old physical address | Old physical address indicates copy source physical storage location in which copied data has been stored. Copy source physical storage location is represented by block address and offset.<br>(Address change request includes plurality of old physical addresses when plurality of data portions are copied.) |
| New QoS domain ID | Identifier of copy destination QoS domain |
| New physical address | New physical address indicates copy destination physical storage location to which data is copied. Copy destination physical storage location is represented by block address and offset.<br>(Address change request includes plurality of new physical addresses when plurality of data portions are copied.) |

F I G. 12

Copy command (without map)

| | Descriptions |
|---|---|
| Command ID | Command ID of copy command |
| Source QoS domain ID | Identifier of Copy source QoS domain |
| Source physical address | Source physical address indicates physical storage location of data to be copied. Source physical address is represented by block address of copy source block and offset in copy source block. |
| Length | Length of data to be copied |
| Destination QoS domain ID | Identifier of copy destination QoS domain |

F I G. 13

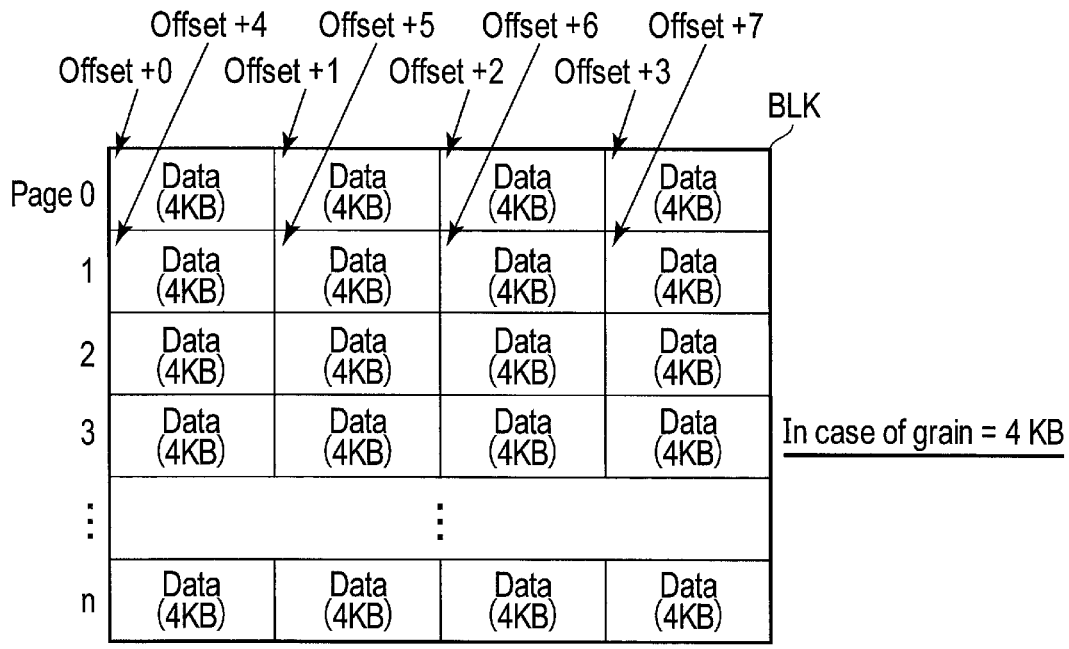

F I G. 14

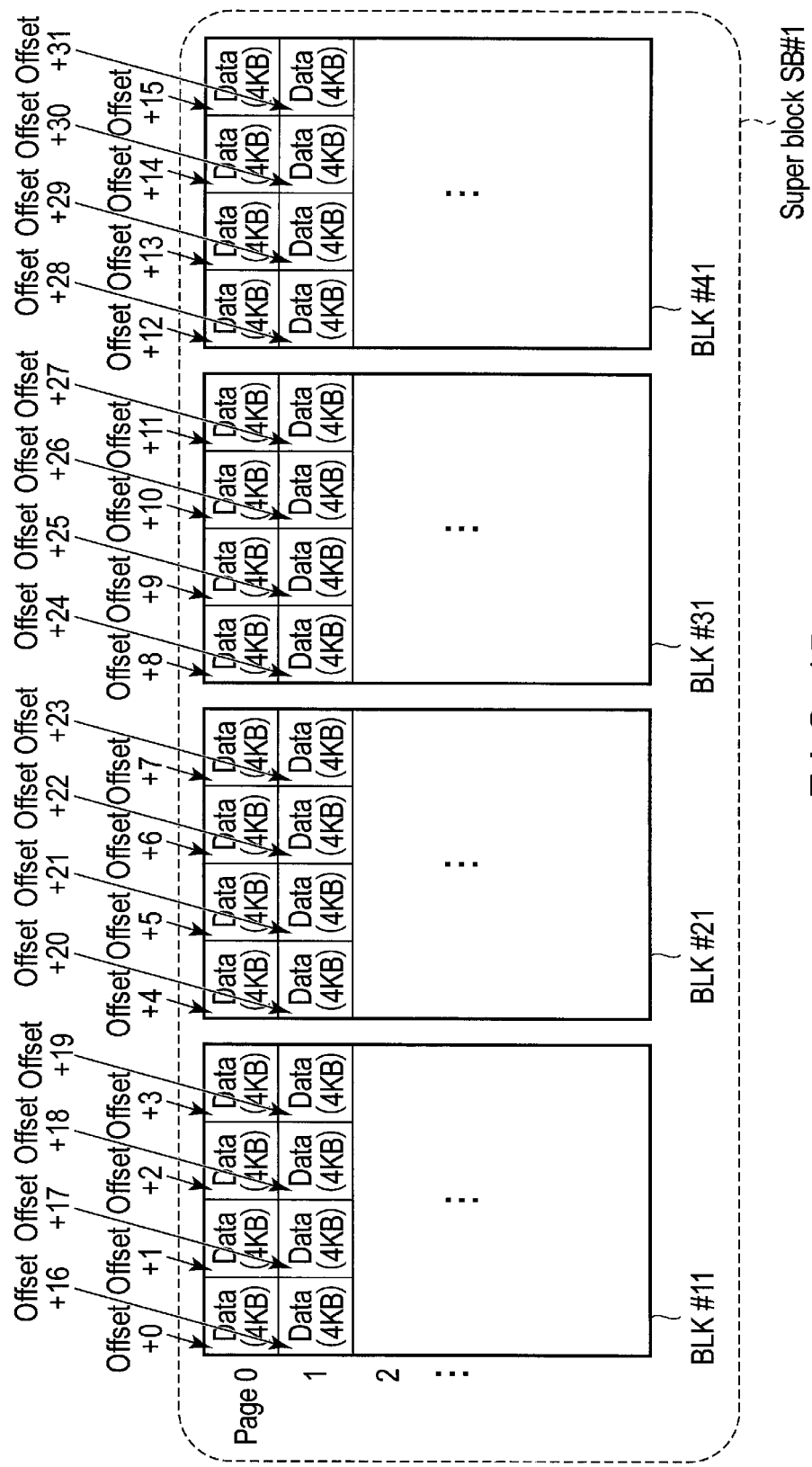
F I G. 15

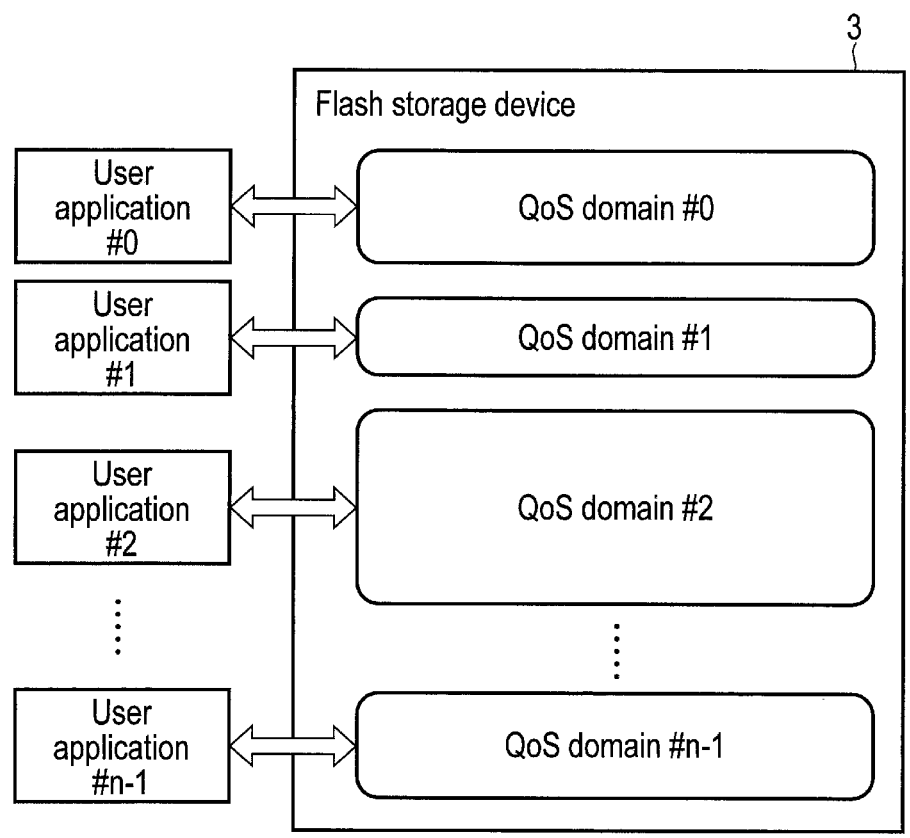
F I G. 16

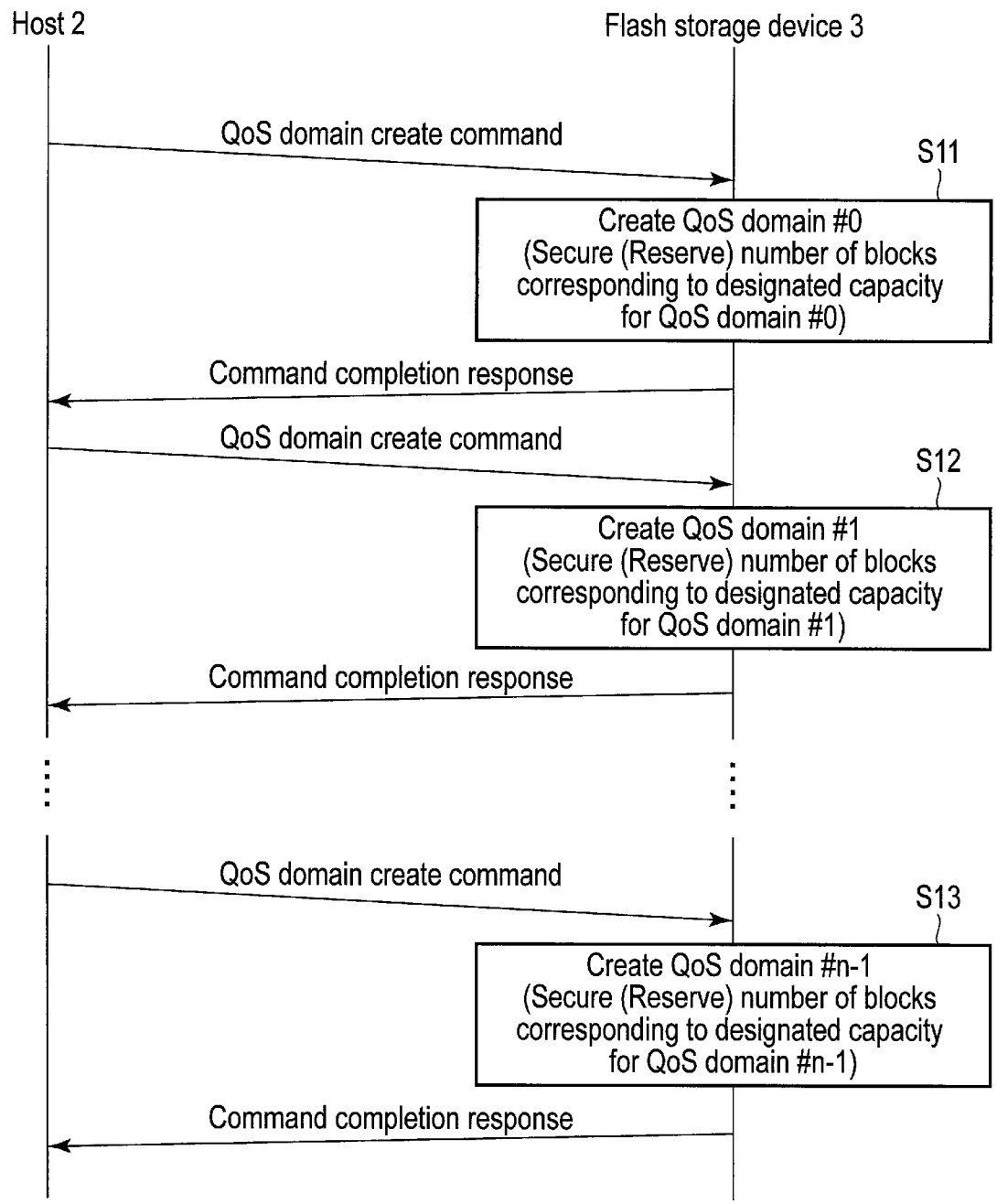
F I G. 17

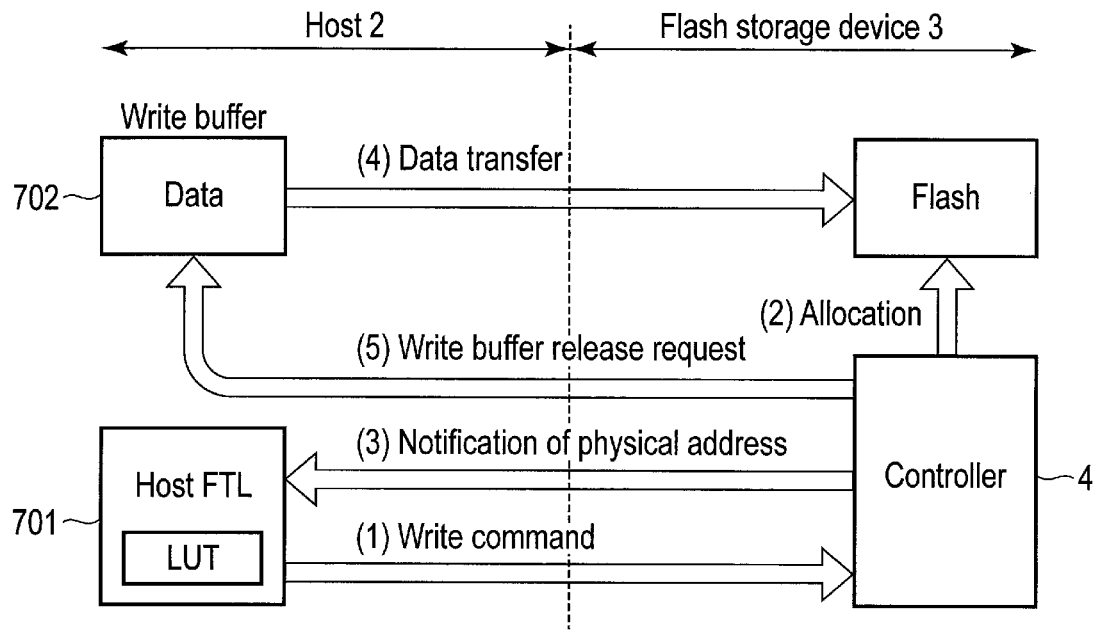
F I G. 18
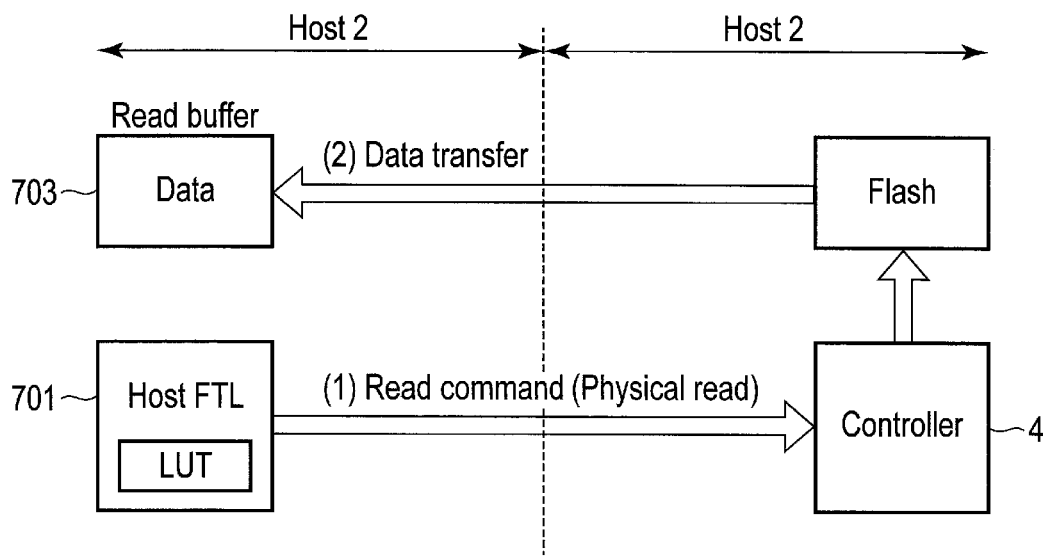
F I G. 19

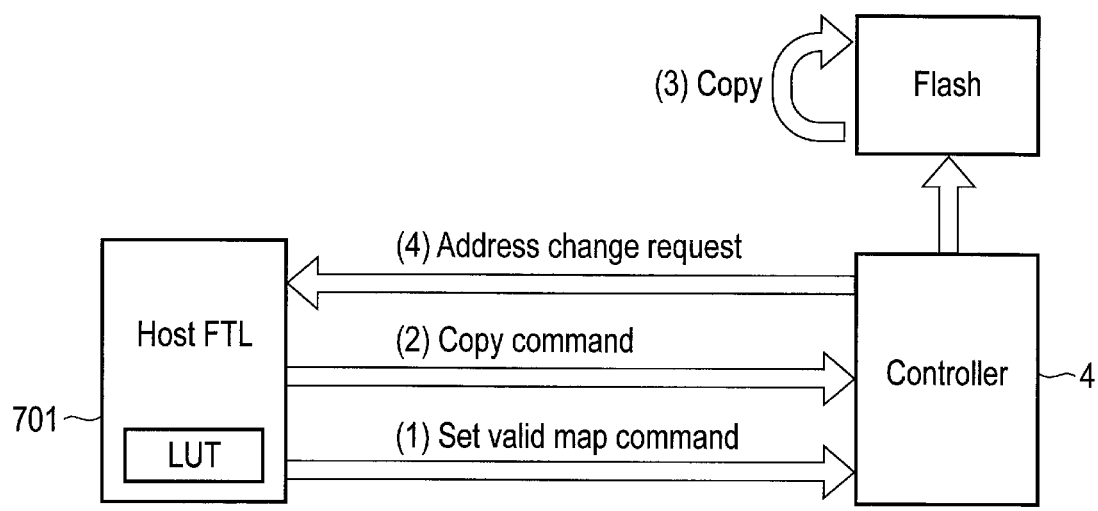
F I G. 20

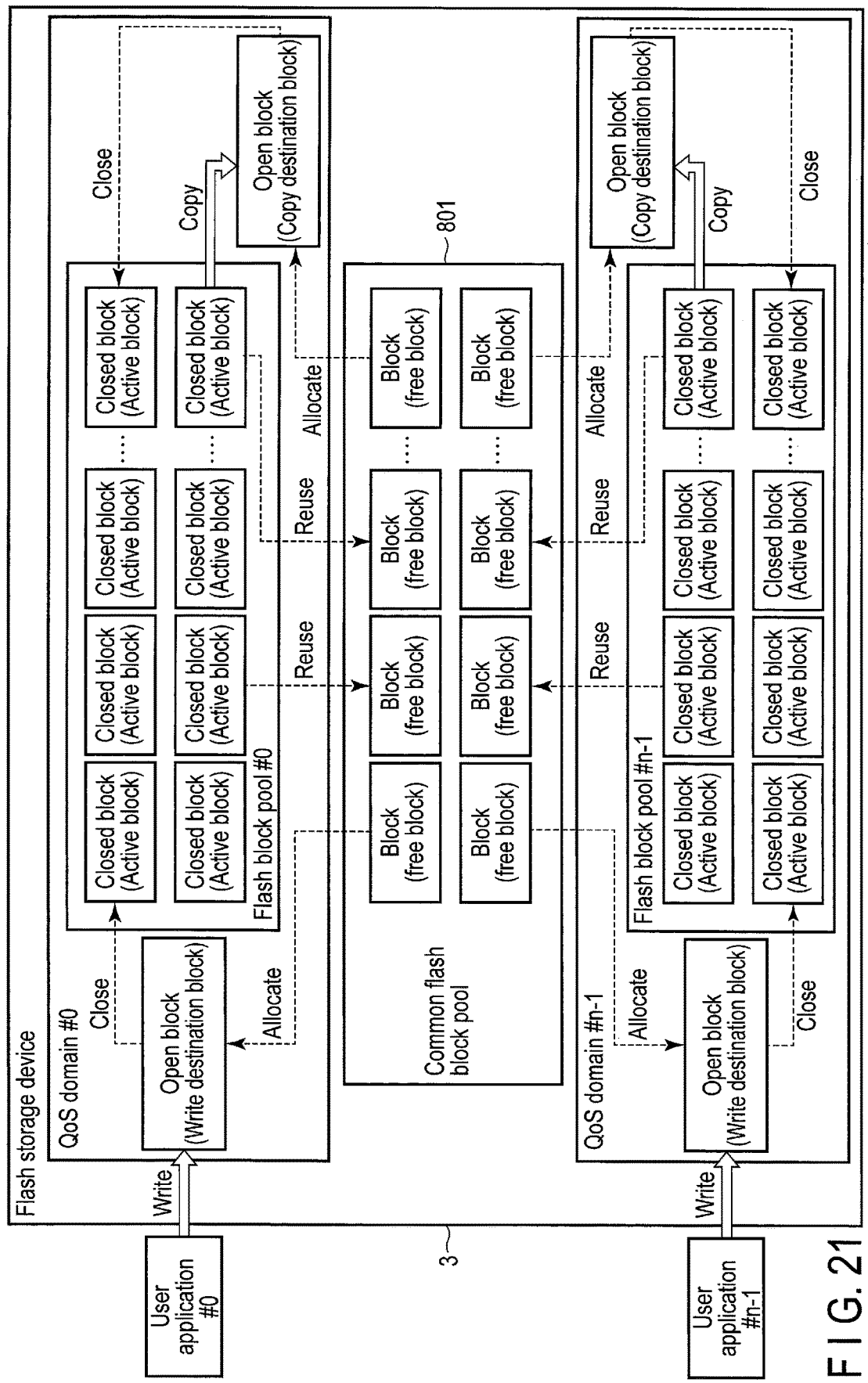
F I G. 21

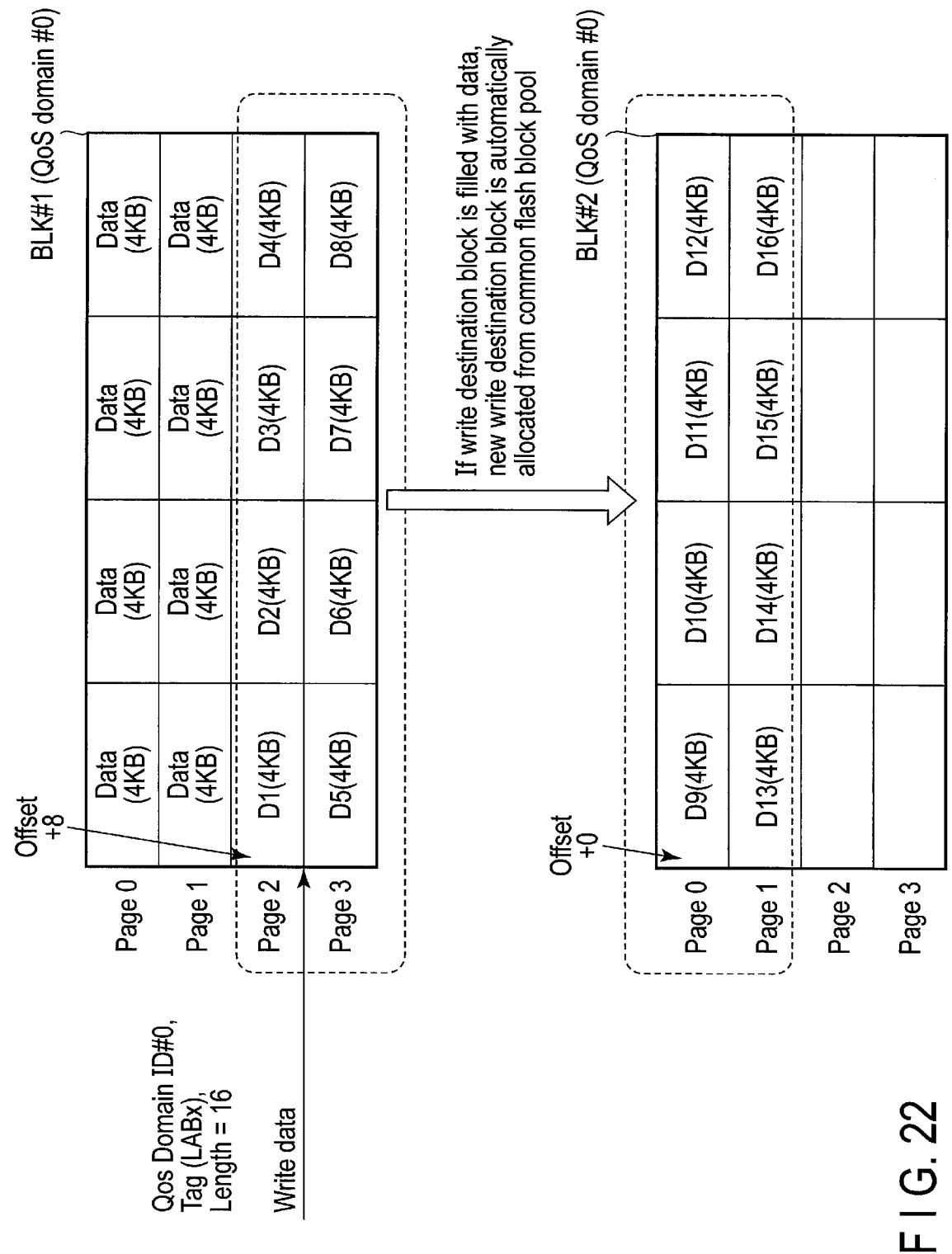
F I G. 22

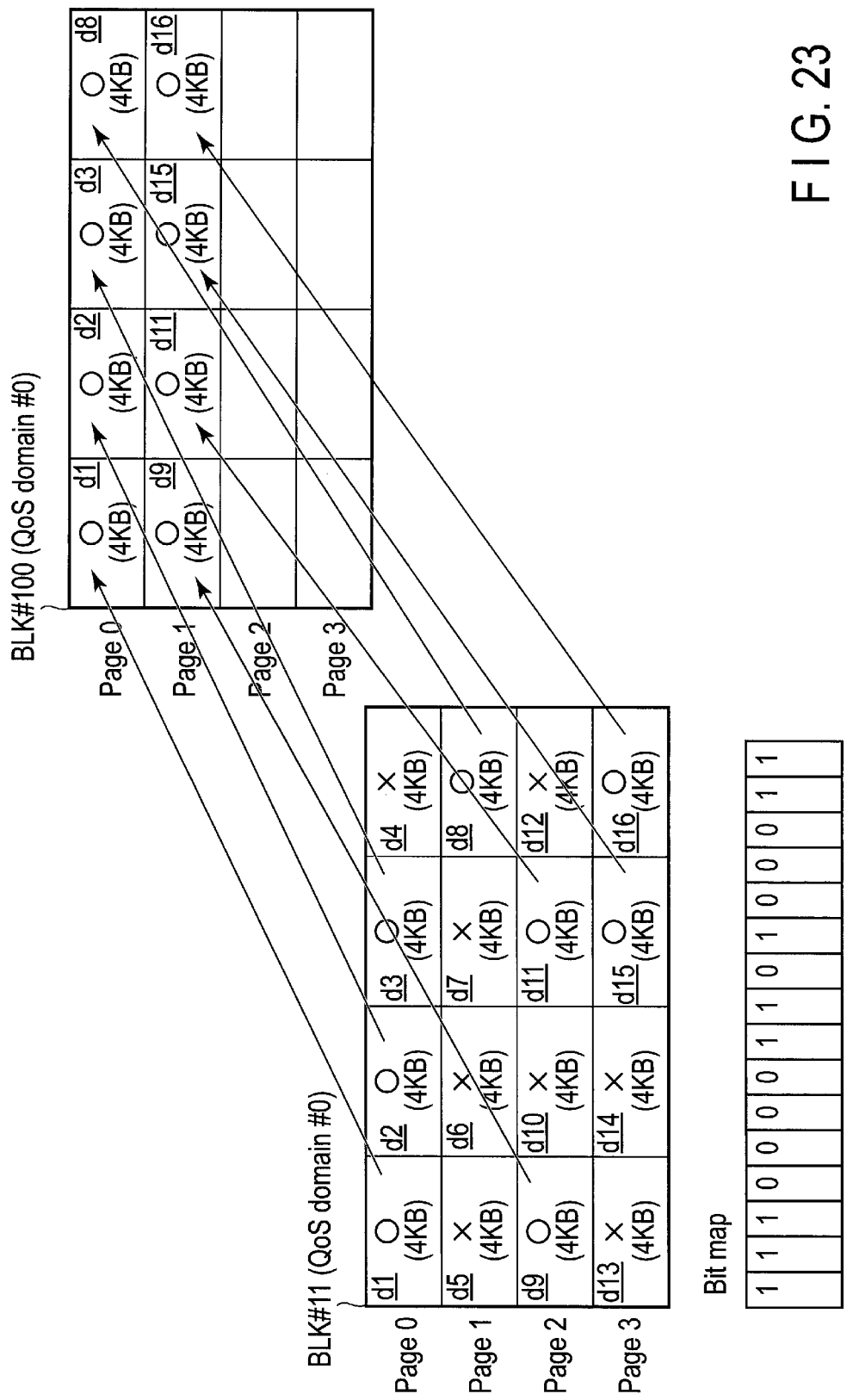
F I G. 23

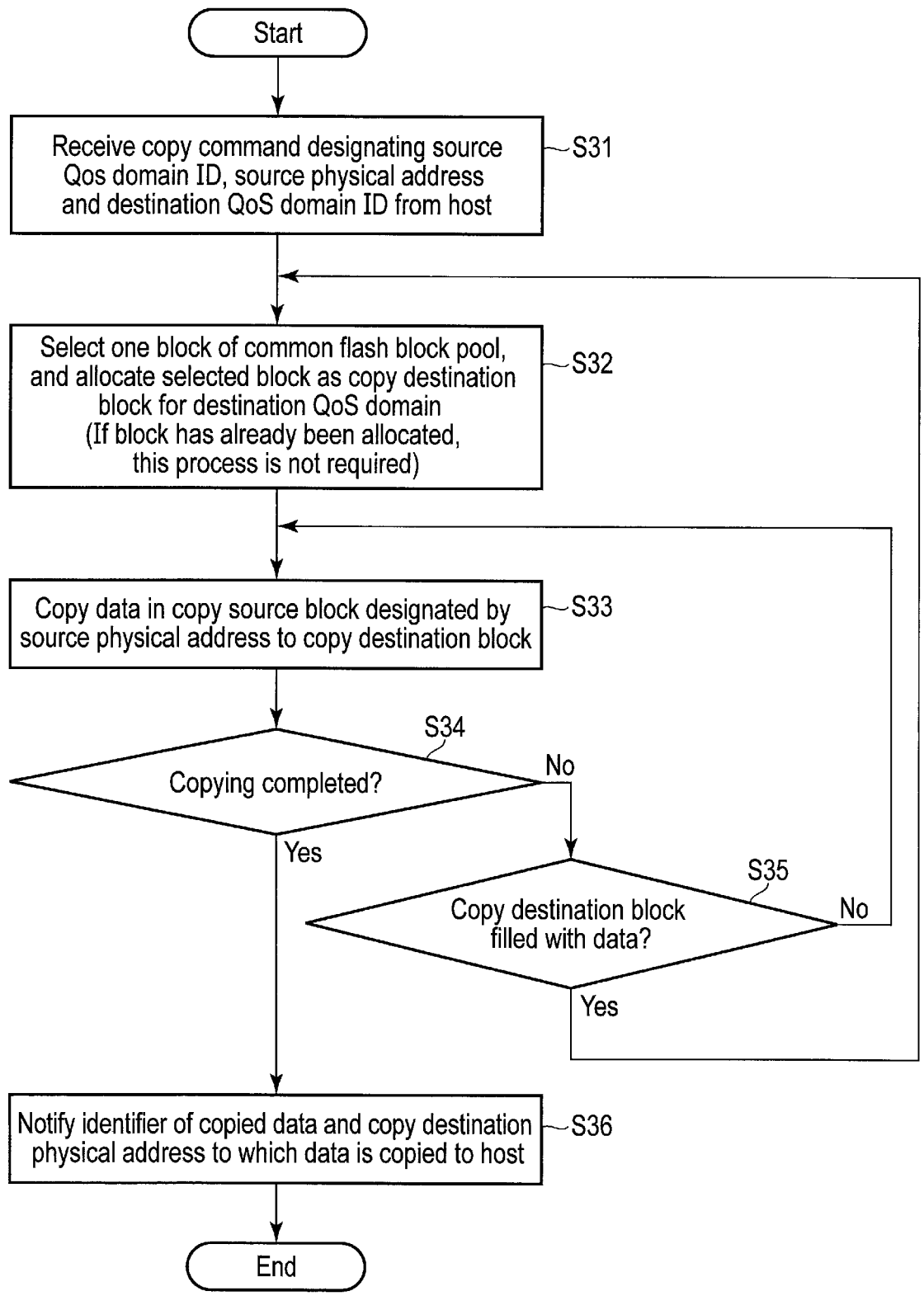
F I G. 26

MEMORY SYSTEM AND METHOD FOR CONTROLLING NONVOLATILE MEMORY

CROSS-REFERENCE TO RELATED APPLICATIONS

This application is continuation of application Ser. No. 16/564,364, filed Sep. 9, 2019, which is based upon and claims the benefit of priority from Japanese Patent Application No. 2019-013221, filed Jan. 29, 2019, the entire contents of each of which are incorporated herein by reference.

FIELD

Embodiments described herein relate generally to technology for controlling a nonvolatile memory.

BACKGROUND

Recently, memory systems comprising nonvolatile memories have been widespread. As such a memory system, a solid state drive (SSD) based on NAND flash technology is known.

An SSD is used as a storage device in a server of a data center.

In a storage device used in a host computing system such as a server, high I/O performance is required.

Therefore, recently, new technology which enables a host to directly control a nonvolatile memory in a storage device has been proposed.

However, if the burden on the host side for controlling data placement on the nonvolatile memory in the storage device increases, a sufficient level of I/O performance cannot be achieved in some cases. For this reason, new technology for reducing the burden on the host side needs to be realized.

BRIEF DESCRIPTION OF THE DRAWINGS

FIG. 1 is a block diagram illustrating the relationship between a host and a memory system according to an embodiment.

FIG. 2 is a diagram illustrating role sharing between the memory system of the embodiment and the host.

FIG. 5 is a diagram illustrating a configuration example of one block (super block) composed of a set of physical blocks.

FIG. 6 is a diagram illustrating a quality-of-service (QoS) domain create command (region create command) applied to the memory system of the embodiment.

FIG. 7 is a diagram illustrating a write command applied to the memory system of the embodiment.

FIG. 8 is a diagram illustrating an address record request transmitted from the memory system of the embodiment to the host.

FIG. 9 is a diagram illustrating a read command applied to the memory system of the embodiment.

FIG. 10 is a diagram illustrating a copy command applied to the memory system of the embodiment.

FIG. 11 is a diagram illustrating a set valid map command applied to the memory system of the embodiment.

FIG. 12 is a diagram illustrating an address change request transmitted from the memory system of the embodiment to the host.

FIG. 13 is a diagram illustrating another type of copy command applied to the memory system of the embodiment.

FIG. 14 is a diagram illustrating a block address and an offset which define a physical address which is included in each of the address record request, the address change request and the read command.

FIG. 15 is a diagram illustrating the relationship between the block address and the offset in a case where the super block is used.

FIG. 16 is a diagram illustrating a plurality of QoS domains managed by the memory system of the embodiment.

FIG. 17 is a sequence chart illustrating a procedure of a QoS domain create process executed by the memory system of the embodiment.

FIG. 18 is a block diagram illustrating a data write process executed by the host and the memory system of the embodiment.

FIG. 19 is a block diagram illustrating a data read process executed by the host and the memory system of the embodiment.

FIG. 20 is a block diagram illustrating a data copy process executed by the host and the memory system of the embodiment.

FIG. 21 is a block diagram illustrating the relationship between a plurality of QoS domains and a common flash block pool managed by the memory system of the embodiment.

FIG. 22 is a diagram illustrating a write destination block allocation operation executed by the memory system of the embodiment when a current write destination block is filled with data by writing of a part of write data associated with a write command.

FIG. 23 is a diagram illustrating a valid data copy operation executed by the memory system of the embodiment based on map information notified from the host.

FIG. 26 is a flowchart illustrating the procedure of the copy destination block allocation operation and the data copy operation executed by the memory system of the embodiment.

DETAILED DESCRIPTION

Figure 3:
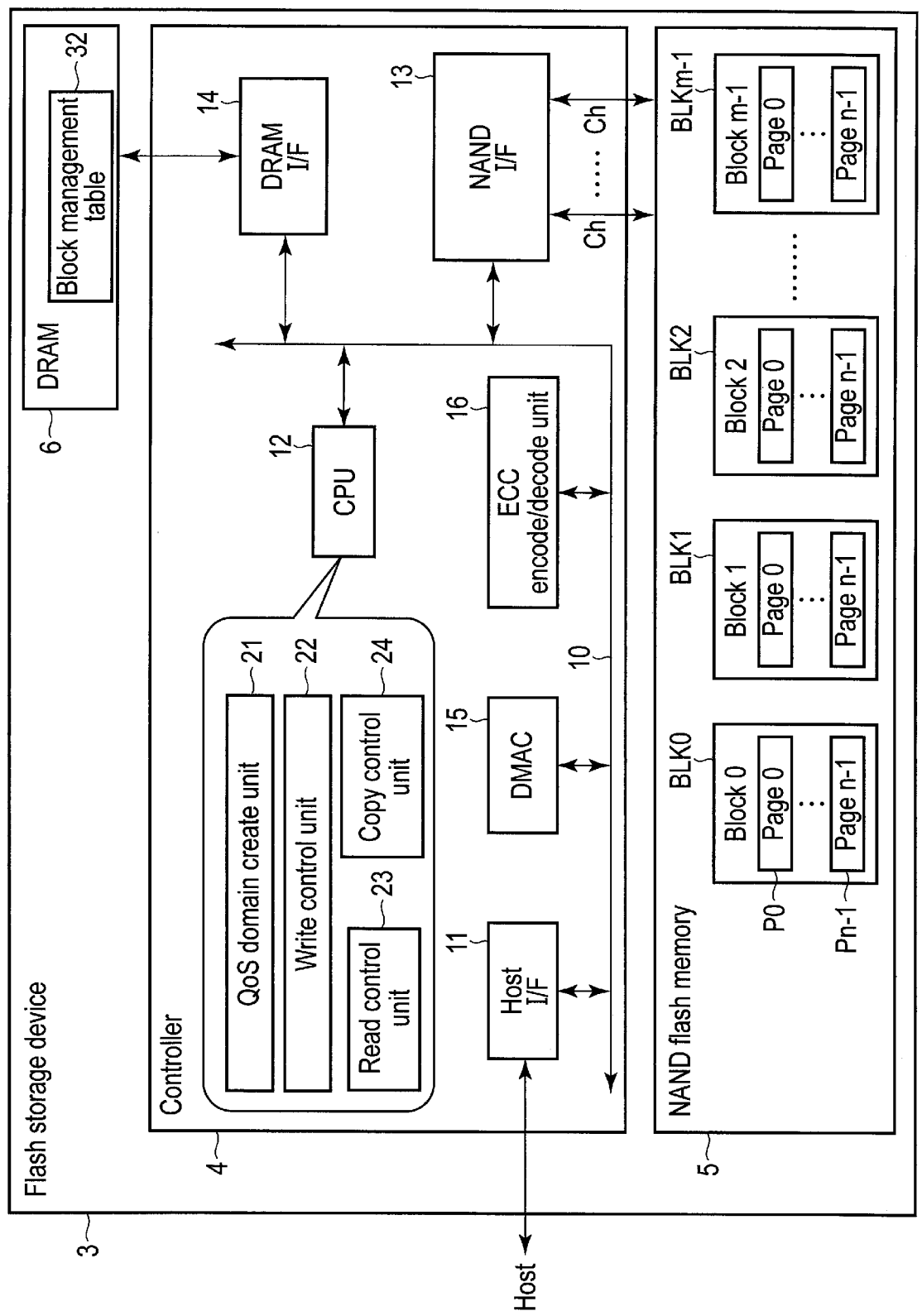
FIG. 3 is a block diagram illustrating a configuration example of the memory system of the embodiment.

Various embodiments will be described hereinafter with reference to the accompanying drawings.

In general, according to one embodiment, a memory system connectable to a host comprises a nonvolatile memory including a plurality of blocks, and a controller electrically connected to the nonvolatile memory and configured to control the nonvolatile memory. The controller creates a plurality of regions, each of which is a subset of the blocks, respectively in response to region create commands received from the host. When receiving a write command including a first identifier of a plurality of identifiers for accessing the regions from the host, the controller allocates one block of a common free block group shared by the regions as a first write destination block for the region corresponding to the first identifier. The controller writes write data associated with the write command to the first write destination block, and notifies an identifier of the write data, a block address of the first write destination block, and an offset indicative of a storage location in the first write destination block to which the write data is written to the host as an address record request. When receiving a copy command including a block address of a copy source block of blocks belonging to the region corresponding to the first identifier, and an identifier of a copy destination target region indicative of the first identifier from the host, the controller allocates one block of the common free block group as a first copy destination block for the region corresponding to the first identifier. The controller copies copy target data from the copy source block to the first copy destination block, and notifies an identifier of the copy target data, a block address of the first copy destination block, and an offset indicative of a location in the first copy destination block to which the copy target data is copied to the host as an address change request.

First, the relationship between a memory system according to the embodiment and a host will be described with reference to FIG. 1.

This memory system is a semiconductor storage device configured to write data to a nonvolatile memory and to read data from a nonvolatile memory. The memory system is realized as a flash storage device 3 based on the NAND flash technology.

A host (host device) 2 is configured to control a plurality of flash storage devices 3. The host 2 is realized by an information processing apparatus configured to use a flash array composed of the flash storage devices 3 as a storage. This information processing apparatus may be a personal computer or a server computer.

Note that the flash storage device 3 may be used as one of storage devices provided in a storage array. The storage array may be connected to an information processing apparatus such as a server computer via a cable or a network. The storage array comprises a controller which controls a plurality of storages (for example, a plurality of flash storage devices 3) in the storage array. If the flash storage devices 3 are applied to the storage array, the controller of the storage array may function as the host of the flash storage devices 3.

In the following, a case where an information processing apparatus such as a server computer functions as the host 2 will be explained as an example.

The host (server) 2 and the flash storage devices 3 are interconnected via an interface 50 (internal interconnection). For example, PCI Express (PCIe) (registered trademark), NVM Express (NVMe) (registered trademark), Ethernet (registered trademark), NVMe over Fabrics (NVMeOF) or the like may be used as the interface 50 for this interconnection. However, the interface 50 is not limited to these examples.

A typical example of the server computer functioning as the host 2 is a server computer (hereinafter referred to as a server) in a data center.

In a case where the host 2 is realized by the server in the data center, this host (server) 2 may be connected to a plurality of end user terminals (clients) 61 via a network 60. The host 2 can provide various services to these end user terminals 61.

Examples of the services which can be provided by the host (server) 2 are (1) Platform as a Service (PaaS) which provides a system running platform for each client (each end user terminal 61), (2) Infrastructure as a Service (IaaS) which provides an infrastructure such as a virtual server for each client (each end user terminal 61), and the like.

A plurality of virtual machines may be operated on a physical server functioning as the host (server) 2. Each virtual machine running on the host (server) 2 can function as a virtual server configured to provide various services for the client (end user terminal 61) corresponding to this virtual machine. In each virtual machine, an operating system and a user application used by the end user terminal 61 corresponding to this virtual machine are operated.

In the host (server) 2, a flash translation layer (host FTL) is also operated. The host FTL includes a lookup table (LUT) which is an address translation table which manages mapping between each of data identifiers (tags) for identifying data to be accessed and each of physical addresses of a nonvolatile memory in the flash storage device 3. The host FTL can recognize data placement on the nonvolatile memory in the flash storage device 3 by using this LUT.

Each flash storage device 3 includes a nonvolatile memory such as a NAND flash memory. The nonvolatile memory includes a plurality of blocks each of which includes a plurality of pages. Each block is a unit of erasing of data, and each page is a unit of writing and reading of data.

The flash storage device 3 can execute low-level abstraction. The low-level abstraction is a function for abstraction of the nonvolatile memory. The low-level abstraction includes a function of assisting data placement, etc. Examples of the function of assisting data placement may include a function of allocating a write destination block to which user data from the host 2 is to be written, a function of determining a write destination location (a write destination block and a location in the write destination block) of the user data, a function of notifying this write destination location (a block address and an offset) to which the user data is written to an upper layer (host 2), and the like.

In addition, examples of the function of assisting data placement may include a function of allocating a copy destination block to which user data already written in the nonvolatile memory is to be copied, a function of determining a copy destination location (a copy destination block and a location in the copy destination block) of the user data, a function of notifying this copy destination location (a block address and an offset) to which the user data is copied to the upper layer (host 2), and the like.

The flash storage device 3 executes various commands received from the host 2. These commands include a write command for writing data to the nonvolatile memory in the flash storage device 3 and a read command for reading data from the nonvolatile memory. In the embodiment, each read command designates a physical address indicative of a storage location in which data to be read is stored. The physical address is represented by the block address of a read target block, and an offset (in-block offset) indicative of the storage location of a read target in this read target block.

The flash storage device 3 receives each read command designating the block address of a read target block and an offset indicative of the storage location of a read target in this read target block from the host 2, and executes a data read operation according to the received read command.

FIG. 2 illustrates role sharing between the flash storage device 3 and the host 2.

In the host (server) 2, a plurality of virtual machines 401 corresponding respectively to a plurality of end users are operated. In each virtual machine 401, an operating system and a user application 402 which are used by the corresponding end user are operated.

In addition, a plurality of I/O services 403 corresponding respectively to the user applications 402 are executed in the host (server) 2. These I/O services 403 may include a logical block address (LBA)-based block I/O service, a key-value store service and the like. Each I/O service 403 includes a lookup table (LUT) which manages mapping between each of tags and each of physical addresses of the flash storage device 3.

The tag here means an identifier which can identify data to be accessed. A typical example of the tag is a logical address such as an LBA. However, the tag is not limited to this example. Alternatively, the key of a key-value store, the hash value of the key or the like may be used as the tag.

The physical address of the flash storage device 3 is an address which specifies a storage location (physical storage location) in the nonvolatile memory included in the flash storage device 3.

In the LBA-based block I/O service, a LUT which manages mapping between each of logical addresses (LBAs) and each of physical addresses of the flash storage device 3 may be used.

On the other hand, in the key-value store service, a LUT which manages mapping among each of keys (or each of the hash values of keys), each of physical addresses of the flash storage device 3 in which data corresponding to these keys are stored, and each of the data lengths of the data corresponding to these keys may be used.

Each end user can select an addressing method to be used (the LBA, the key of the key-value store, the hash value of the key or the like).

In the host (server) 2, a plurality of write buffers (WB) 404 corresponding respectively to the virtual machines 401 may be managed. Write data from a certain user application 402 may be temporarily stored in the write buffer (WB) 404 for the virtual machine 401 corresponding to this user application 402.

Transmission of a command from the host (server) 2 to the flash storage device 3 and return of a command completion response, etc., from the flash storage device 3 to the host (server) 2 are executed via an I/O queue 500 which exists in each of the host (server) 2 and the flash storage devices 3.

The flash storage device 3 manages a plurality of regions obtained by logically dividing the nonvolatile memory in the flash storage device 3, as QoS domains 601. Each QoS domain 601 is a subset of blocks included in the nonvolatile memory. Each block included in the nonvolatile memory belongs to only one QoS domain 601, and the same block will not simultaneously belong to different QoS domains 601.

These QoS domains 601 are identified by identifiers which are referred to as QoS domain IDs, respectively. These QoS domain IDs are used as identifiers for accessing these regions (QoS domains).

In the embodiment, each write command designates the identifier (QoS domain ID) of a region (QoS domain) to which data is to be written. When the flash storage device 3 receives a write command designating a certain QoS domain ID from the host 2, the flash storage device 3 selects one block of a common block group 602 shared by the QoS domains 601, and allocates this selected block as the write destination block for the QoS domain having this QoS domain ID.

The write destination block here means a block to which data is to be written. The common block group 602 is a common free block group including a set of free blocks shared by the QoS domains 601.

The free block means a block in a state (free state) of being reusable (reallocatable) as a new write destination block. A typical example of the free block is a block which stores no valid data. The valid data means the latest data associated with a tag such as an LBA. That is, data linked from the LUT of the host 2 as the latest data is valid data. In addition, invalid data means data which is not associated with a tag such as an LBA. Data which is not linked from the LUT of the host 2 is invalid data. For example, when updated data corresponding to a certain LBA is written to the flash storage device 3, previous data corresponding to this LBA becomes invalid data.

Subsequently, the flash storage device 3 writes data associated with the received write command to the write destination block allocated to this QoS domain. Note that, if a usable write destination block has already been allocated to this QoS domain, it is unnecessary to perform the above-described operation of allocating one block (free block) of the common block group 602 as the write destination block for this QoS domain. The flash storage device 3 writes data associated with the received write command to the next usable page in this already-allocated write destination block.

When the data associated with the received write command is written to the write destination block, the flash storage device 3 transmits the tag of this data and a physical address (a block address and an offset) indicative of a storage location in the nonvolatile memory to which this data is written to the host 2 as an address record request. The block address is an identifier for identifying this write destination block. Since the nonvolatile memory is usually composed of a plurality of nonvolatile memory chips (nonvolatile memory dies), the block address of a certain block may be represented by the chip number of a nonvolatile memory chip and the block number in the chip. The offset indicates a storage location in this write destination block.

In response to this address record request, the host 2 can update the LUT such that the physical address (the block address and the offset) will be associated with the tag of this data.

Regarding each block included in each QoS domain, the host 2 can determine whether data stored in each block is valid data or invalid data by using the LUT. In addition, the host 2 can transmit a command (reuse command) to transition a block to which data has already been written to a reusable state (free block) of being usable as a new write destination block to the flash storage device 3.

FIG. 3 illustrates a configuration example of the flash storage device 3.

The flash storage device 3 comprises a controller 4 and a nonvolatile memory (NAND flash memory) 5. The flash storage device 3 may comprise a random access memory, for example, a DRAM 6.

The NAND flash memory 5 comprises a memory cell array comprising a plurality of memory cells arrayed in a matrix. The NAND flash memory 5 may be a NAND flash memory having a two-dimensional structure or a NAND flash memory having a three-dimensional structure.

The memory cell array of the NAND flash memory 5 includes a plurality of blocks BLK0 to BLKm−1. Each of the blocks BLK0 to BLKm−1 includes a plurality of pages (pages P0 to Pn−1 in this case). The blocks BLK0 to BLKm−1 function as erase units. The blocks may be referred to as "erase blocks", "physical blocks" or "physical erase blocks". The pages P0 to Pn−1 are units of data write operation and data read operation.

The controller 4 is electrically connected to the NAND flash memory 5, which is a nonvolatile memory, via a NAND interface 13 such as toggle NAND flash interface or open NAND flash interface (ONFI). The controller 4 operates as a memory controller configured to control the NAND flash memory 5. The controller 4 may be realized by a circuit such as a system-on-a-chip (SoC).

Figure 4:
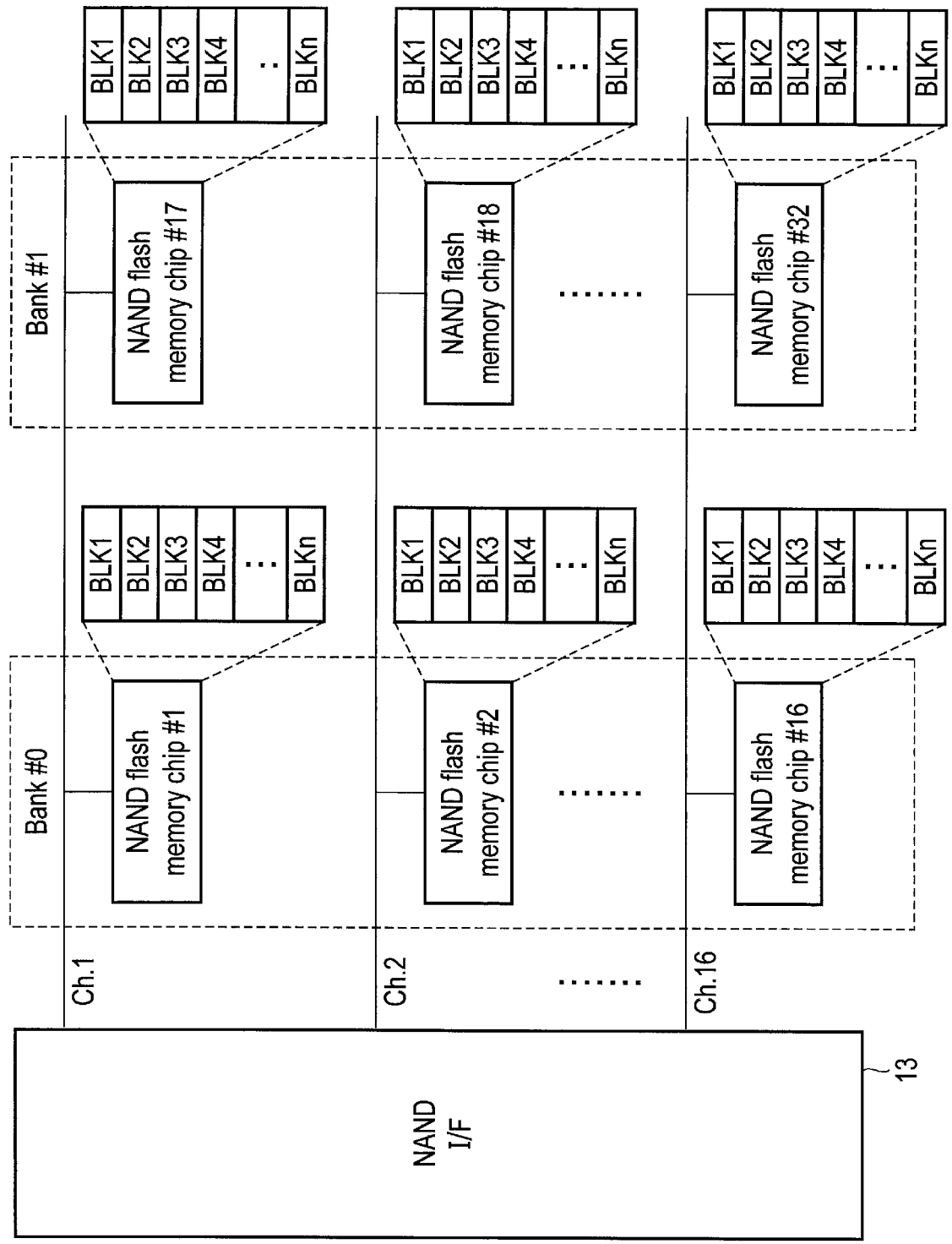
FIG. 4 is a block diagram illustrating the relationship between a NAND interface and a plurality of NAND flash memory chips provided in the memory system of the embodiment.

As illustrated in FIG. 4, the NAND flash memory 5 may include a plurality of NAND flash memory chips (NAND flash memory dies). Each NAND flash memory chip is independently operable. Therefore, the NAND flash memory chips function as units operable in parallel. FIG. 4 illustrates a case where sixteen channels Ch. 1 to Ch. 16 are connected to the NAND interface 13 and two NAND flash memory chips are connected to each of sixteen channels Ch. 1 to Ch. 16 as an example. In this case, sixteen NAND flash memory chips #1 to #16 connected to the channels Ch. 1 to Ch. 16 may be organized as a bank #0 and the remaining sixteen NAND flash memory chips #17 to #32 connected to the channels Ch. 1 to Ch. 16 may be organized as a bank #1. The bank functions as a unit of parallel operation of a plurality of memory modules by bank interleaving. In the configuration example of FIG. 4, a maximum of thirty two NAND flash memory chips can be operated in parallel by sixteen channels and bank interleaving using two banks.

An erase operation may be executed in units of one block (physical block) or in units of a block group (super block) including a set of physical blocks operable in parallel. One block group (super block) may include a total of thirty two physical blocks selected one by one from the NAND flash memory chips #1 to #32. However, the configuration is not limited to this example. Note that each of the NAND flash memory chips #1 to #32 may have a multiplane configuration. For example, if each of the NAND flash memory chips #1 to #32 has a multiplane configuration including two planes, one super block may include a total of sixty four physical blocks selected one by one from sixty four planes corresponding to the NAND flash memory chips #1 to #32.

FIG. 5 illustrates one super block (SB) including thirty two physical blocks (a physical block BLK2 in the NAND flash memory chip #1, a physical block BLK3 in the NAND flash memory chip #2, a physical block BLK7 in the NAND flash memory chip #3, a physical block BLK4 in the NAND flash memory chip #4, a physical block BLK6 in the NAND flash memory chip #5, . . . , and a physical block BLK3 in the NAND flash memory chip #32) as an example.

The write destination block may be a physical block or a super block. Note that one super block may include only one physical block. In this case, one super block is equal to one physical block.

Next, the configuration of the controller 4 of FIG. 3 will be explained.

The controller 4 includes a host interface 11, a CPU 12, a NAND interface 13, a DRAM interface 14, a direct memory access controller (DMAC) 15, an ECC encode/decode unit 16 and the like. The host interface 11, the CPU 12, the NAND interface 13, the DRAM interface 14, the DMAC 15 and the ECC encode/decode unit 16 are interconnected via a bus 10.

The host interface 11 is a host interface circuit configured to execute communication with the host 2. The host interface 11 may be, for example, a PCIe controller (NVMe controller). Alternatively, in a case where the flash storage device 3 is connected to the host 2 via Ethernet (registered trademark), the host interface 11 may be an NVMe over Fabrics (NVMeOF) controller.

The host interface 11 receives various commands from the host 2. These commands include a QoS domain create command, a write command, a read command, a copy command, an erase command, a reuse command and various other commands.

The CPU 12 is a processor configured to control the host interface 11, the NAND interface 13, the DRAM interface 14, the DMAC 15 and the ECC encode/decode unit 16. The CPU 12 loads a control program (firmware) from the NAND flash memory 5 or a ROM (not illustrated) to the DRAM 6 in response to the power-on of the flash storage device 3, and executes various processes by executing the firmware. Note that the firmware may be loaded to a SRAM (not illustrated) in the controller 4. The CPU 12 can execute command processing for processing various commands from the host 2, and the like. The operation of the CPU 12 is controlled by the above-described firmware executed by the CPU 12. Note that a part or all of the command processing may be executed by dedicated hardware in the controller 4.

The CPU 12 can function as a QoS domain create unit 21, a write control unit 22, a read control unit 23 and a copy control unit 24. Note that a part or all of each of the QoS domain create unit 21, the write control unit 22, the read control unit 23 and the copy control unit 24 may also be realized by dedicated hardware in the controller 4.

In response to region create commands (QoS domain create commands) received from the host 2, the QoS domain create unit 21 creates a plurality of regions (QoS domains), each of which is a subset of blocks included in the NAND flash memory 5, respectively. Each QoS domain create command may include a parameter designating the capacity of a QoS domain to be created. The QoS domain create unit 21 creates one QoS domain according to the received QoS domain create command, and secures (reserves) a predetermined number of blocks of the common block group 602 for this QoS domain. The number of blocks to be secured is determined by the capacity designated by the received QoS domain create command.

When the write control unit 22 receives a write command including the first QoS domain ID of the QoS domain IDs for accessing the QoS domains from the host 2, the write control unit 22 allocates one block of the common block group 602 as the write destination block for the QoS domain corresponding to the first QoS domain ID. The block allocated as the write destination block for this QoS domain may be a physical block or a super block.

In this case, the write control unit 22 may select a block (physical block or super block) having a minimum program/erase cycle count from the common block group 602. Consequently, wear leveling can be executed among the QoS domains. If a usable write destination block has already been allocated to this QoS domain, the operation of allocating one block of the common block group 602 as the write destination block for this QoS domain will not be executed.

The write control unit 22 determines a storage location in this write destination block to which data is to be written in consideration of restrictions on page write order, defective pages in this write destination block, and the like. Subsequently, the write control unit 22 writes write data associated with the received write command to the write destination block for this QoS domain. In this case, the write control unit 22 can write not only write data from the host 2 but also the write data and the tag of the write data to the write destination block.

Subsequently, the write control unit 22 notifies the identifier (tag) of the write data, the block address of this write destination block, and an offset indicative of a storage location (write destination location) in this write destination block to which the write data is written to the host 2.

In a case where a physical block is allocated as the write destination block, the block address is a block address for identifying this physical block. The block address may be expressed by a chip number and a block number in the chip.

In a case where a super block is allocated as the write destination block, the block address is a block address (also referred to as a super block address) for identifying this super block. Different super block addresses may be given to all super blocks in the flash storage device 3.

The offset indicates an offset from the beginning of the write destination block to the write destination location, that is, an offset of the write destination location with respect to the beginning of the write destination block. The size of the offset from the beginning of the write destination block to the write destination location may be represented by a multiple of a grain having a certain size. Alternatively, the offset may be represented by the page address of a page and an offset in the page.

Similarly, when the write control unit 22 receives a write command including the second QoS domain ID of the QoS domain IDs for accessing the QoS domains from the host 2, the write control unit 22 allocates one block of the common block group 602 as the write destination block for the QoS domain corresponding to the second QoS domain ID. The write control unit 22 writes write data associated with the received writ command to the write destination block for this QoS domain. Subsequently, the write control unit 22 notifies the identifier (tag) of the write data, the block address of this write destination block, and an offset indicative of a storage location in this write destination block to which the write data is written to the host 2.

As described above, a plurality of write destination blocks corresponding respectively to a plurality of QoS domains are allocated in the embodiment. Subsequently, write data associated with a write command designating a certain QoS domain ID is written to the write destination block for the QoS domain corresponding to this QoS domain ID. In addition, write data associated with a write command designating other QoS domain ID is written to the write destination block for the QoS domain corresponding to the other QoS domain ID.

Consequently, write data from different user applications can be written to different write destination blocks. As a result, the burden on the host 2 side for data placement, that is, for writing write data from user applications to different blocks can be reduced.

In addition, if the write destination block for the QoS domain corresponding to the first QoS domain ID is completely filled with data during the execution of the write command including the first QoS domain ID, the write control unit 22 executes an operation of automatically allocating a new write destination block.

That is, if the current write destination block for the QoS domain corresponding to the first QoS domain ID is completely filled with data by writing of the first data part, which is a part of write data associated with the write command including the first QoS domain ID, the write control unit 22 allocates one block of the common block group 602 as the new write destination block for the QoS domain corresponding to the first QoS domain ID. Subsequently, the write control unit 22 writes the second data part, which is the remaining part of this write data, to this new write destination block.

Similarly, if the current write destination block for the QoS domain corresponding to the second QoS domain ID is completely filled with data by writing of the first data part, which is a part of write data associated with the write command including the second QoS domain ID, the write control unit 22 allocates one block of the common block group 602 as the new write destination block for the QoS domain corresponding to the second QoS domain ID. Subsequently, the write control unit 22 writes the second data part, which is the remaining part of this write data, to this new write destination block.

Consequently, even if a current write destination block is used up during the execution of a write command, the write operation corresponding to this write command can still be continued without the notification of an error to the host 2. As a result, the burden on the host 2 side for changing a block to which data is to be written from a current write destination block to another block can be reduced. In addition, the host 2 can issue each write command without considering the boundary of blocks.

If data has already been written in some of pages in a current write destination block by a preceding write command, write data associated with a new write command will be written to one or more pages succeeding the pages in which data has already been written. If write data associated with a certain write command is completely written to a current write destination block and the current write destination block is used up, this is a state where no write destination block is allocated to this QoS domain. If a new write command designating this QoS domain is received in this state, a new write destination block will be allocated to this QoS domain.

When the read control unit 23 receives a read command designating the QoS domain ID of a read target QoS domain and a physical address (that is, a block address and an offset) from the host 2, the read control unit 23 reads data from the NAND flash memory 5 based on the block address and the offset. The read target block is specified by the block address. The read target storage location in this block is specified by the offset.

According to a copy command received from the host 2, the copy control unit 24 copies data stored in a certain block allocated to a certain QoS domain to a block (copy destination block) for this QoS domain or for another QoS domain. The copy destination block is a write destination block to which data already written in the nonvolatile memory is to be written (copied). The copy command may designate the QoS domain ID of a copy source QoS domain, the block address of a copy source block, and the QoS domain ID (copy destination domain ID) of a copy destination QoS domain. The copy source block may be a physical block or a super block.

For example, if the copy control unit 24 receives a copy command including the block address of a copy source block of blocks belonging to the QoS domain corresponding to the first QoS domain ID, and a copy destination QoS domain ID indicative of the first QoS domain ID, the copy control unit 24 allocates one block of the common block group 602 as the copy destination block for the QoS domain corresponding to the first QoS domain ID. The block allocated as the copy destination block for this QoS domain may be a physical block or a super block.

In this case, the copy control unit 24 may select a block (physical block or super block) having a minimum program/erase cycle count from the common block group 602. Consequently, wear leveling can be executed among the QoS domains. If a usable copy destination block has already been allocated to this QoS domain, the operation of allocating one block of the common block group 602 as the copy destination block for this QoS domain will not be executed.

The copy control unit 24 copies copy target data from the copy source block to the copy destination block. Subsequently, the copy control unit 24 notifies the identifier (tag) of the copy target data, the block address of the copy destination block, and an offset indicative of a location in the copy destination block to which the copy target data is copied to the host 2.

As described above, in the QoS domain corresponding to the first QoS domain ID, a block different from a write destination block is allocated as a copy destination block. Consequently, it is possible to realize such data placement that a write destination block to which data is to be written from the host 2 and a copy destination block to which data already written in the NAND flash memory 5 is to be copied are isolated from each other without the control of the host 2.

In addition, if the copy control unit 24 receives a copy command including the block address of a copy source block of blocks belonging to the QoS domain corresponding to the second QoS domain ID, and a copy destination QoS domain ID indicative of the second QoS domain ID, the copy control unit 24 allocates one block of the common block group 602 as the copy destination block for the QoS domain corresponding to the second QoS domain ID.

The copy control unit 24 copies copy target data from the copy source block to the copy destination block. Subsequently, the copy control unit 24 notifies the identifier (tag) of the copy target data, the block address of the copy destination block, and an offset indicative of a location in the copy destination block to which the copy target data is copied to the host 2.

As described above, a write destination block and a copy destination block different from the write destination block are allocated to each QoS domain in the embodiment.

Generally, data is more likely to be updated in a case where the data has just been written by the host 2 (new data), and data is less likely to be updated in a case where a long time has elapsed since the data was written by the host 2 (old data). The copy target data is data which has already been written in the NAND flash memory 5. Therefore, the copy target data is usually old data in many cases.

Consequently, it is possible to prevent new data (data with a high update frequency) and old data (with a low update frequency) from being mixed in the same block by isolating host write and write for copying from each other.

The mixture of new data (with a high update frequency) and old data (with a low update frequency) may cause an increase of the write amplification of the flash storage device 3.

This is because, in a block in which new data and old data are mixed, while only a part of the region in the block is invalidated early by updating of new data, the remaining region in the block (old data) is maintained in a valid state for a long time.

If a block is filled only with new data, it is highly likely that all data in the block will be invalidated relatively early by updating (rewriting) of these data. Therefore, it is possible to make this block reusable simply by executing an erase operation on this block without executing a garbage collection operation.

Meanwhile, if a block is filled only with old data, all data in the block are maintained in a valid state for a long time. Therefore, it is highly likely that this block will not be subjected to a garbage collection operation for a long time.

An increase of the write amplification causes an increase of the number of rewrites (the number of program/erase cycles) of each block. That is, as the write amplification (WA) increases, the number of rewrites of the block reaches its upper limit early. As a result, the life of the flash storage device 3 will be degraded.

In the embodiment, a write destination block and a copy destination block different from the write destination block are allocated to each QoS domain by the flash storage device 3. Therefore, the write amplification can be reduced without the process on the host 2 side for isolating a block to which data is to be written and a block to which data is to be copied from each other.

In addition, if the copy destination block for the QoS domain corresponding to the first QoS domain ID is completely filled with data during the execution of a copy command designating the QoS domain corresponding to the first QoS domain ID as a copy destination QoS domain, the copy control unit 24 executes an operation of automatically allocating a new copy destination block.

That is, if the current copy destination block for the QoS domain corresponding to the first QoS domain ID is completely filled with data by copying of the third data part, which is a part of copy target data in a copy source block, the copy control unit 24 allocates one block of the common block group 602 as the new copy destination block for the QoS domain corresponding to the first QoS domain ID. Subsequently, the copy control unit 24 copies the fourth data part, which is the remaining part of this copy target data, to this new copy destination block.

Similarly, if the copy destination block for the QoS domain corresponding to the second QoS domain ID is completely filled with data during the execution of a copy command designating the QoS domain corresponding to the second QoS domain ID as a copy destination QoS domain, the copy control unit 24 executes an operation of automatically allocating the new copy destination block for the QoS domain corresponding to the second QoS domain ID.

Consequently, even if a current copy destination block is used up during the execution of a copy command, the copy operation corresponding to this copy command can still be continued without the notification of an error to the host 2. As a result, the burden on the host 2 side for changing a block to which data is to be copied from a current copy destination block to another block can be reduced.

If some of pages in a current copy destination block are filled with data by a data copy operation based on a preceding copy command, copy target data based on a new copy command will be written to one or more pages succeeding the pages in which data has already been written. If copy target data based on a copy command is completely copied to a current copy destination block and the current copy destination block is used up, this is a state where no copy destination block is allocated to this QoS domain. If a new copy command designating this QoS domain as a copy destination QoS domain is received in this state, a new copy destination block will be allocated to this QoS domain.

The NAND interface 13 is a memory control circuit configured to control the NAND flash memory 5 under the control of the CPU 12.

The DRAM interface 14 is a DRAM control circuit configured to control the DRAM 6 under the control of the CPU 12. The storage region in the DRAM 6 is used for storing a block management table 32. In addition, the storage region of the DRAM 6 may also be used as an internal buffer for temporarily storing write data, etc. The flash storage device 3 may have such a buffer-less configuration that an internal buffer does not exist in the flash storage device 3 or the capacity of an interval buffer is close to approximately zero.

The block management table 32 includes a plurality of management tables corresponding respectively to a plurality of blocks in the NAND flash memory 5. Each management table is used for storing management information (metadata) for managing the block corresponding to this management table. The metadata may include the number of rewrites (the number of program/erase cycles), an open/closed state, a write destination page range and the like. However, the metadata is not limited to these examples. The open/closed state indicates whether this block is in an open state or a closed state. The open state indicates a state where this block is being used as a write destination block. The write destination block implies a write destination block for host write to which data is to be written from the host 2, and a write destination block (copy destination block) for copying to which data already written in the nonvolatile memory is to be copied.

The closed state indicates a state where a block is filled with data and is managed as an active block. The write destination page range indicates pages on which the write (program) operation is currently executed.

The DMAC 15 executes data transfer between the memory (write buffer) in the host 2 and the DRAM 6 (internal buffer) under the control of the CPU 12. When write data is to be transferred from the write buffer of the host 2 to the internal buffer, the CPU 12 designates a transfer source address indicative of a location on the write buffer, a data size and a transfer destination address indicative of a location on the internal buffer to the DMAC 15.

When data is to be written to the NAND flash memory 5, the ECC encode/decode unit 16 encodes (ECC-encodes) write data to be written and thereby adds an error-correction code (ECC) to the data. When data is read from the NAND flash memory 5, the ECC encode/decode unit 16 executes error correction (ECC-decoding) of the data by using the ECC added to the read data.

FIG. 6 illustrates the QoS domain create command applied to the flash storage device 3.

The QoS domain create command is a command for creating a QoS domain (region create command). This QoS domain create command may include a command ID, a QoS domain ID and a capacity.

The command ID is an identifier unique to this command (this QoS domain create command in this case). The QoS domain ID is the identifier of a QoS domain to be created. The capacity indicates a capacity to be secured for the QoS domain to be created. The controller 4 secures (reserves) the number of blocks corresponding to this capacity from the common block group 602, and in response to receiving a write command designating this QoS domain ID, the controller 4 allocates one block of the secured blocks as the write destination block for this QoS domain.

FIG. 7 illustrates the write command applied to the flash storage device 3.

The write command is a command which requests the flash storage device 3 to write data. This write command may include a command ID, a QoS domain ID, a tag, a length, a write buffer address and the like.

The command ID is an identifier unique to this command (this write command in this case). The QoS domain ID is an identifier which can uniquely identify a QoS domain to which data is to be written. A write command transmitted from the host 2 in response to a write request from the application corresponding to a certain end user includes a QoS domain ID designating the QoS domain corresponding to this end user.

The tag is an identifier for identifying write data to be written. The tag may be a logical address such as an LBA, a key of a key-value store or the hash value of the key as described above.

The length indicates the length of write data to be written. This length (data length) may be designated by the number of grains described above, the number of LBAs or bytes.

The write buffer address indicates a location in the host memory (write buffer of the host 2) in which write data to be written is stored. The write buffer address is also referred to as a data pointer.

The controller 4 can also manage an active block list (active block pool) corresponding to each QoS domain, in addition to the common block group 602.

The state of each block is roughly classified into an active block (block in a closed state) where valid data is stored and a free block where valid data is not stored and which can be reused as a write destination block. In a certain QoS domain, each block which is an active block is managed by the active block list corresponding to this QoS domain. On the other hand, each free block of each QoS domain is managed by the common block group 602.

When the controller 4 receives a write command designating a certain QoS domain ID from the host 2, the controller 4 selects one block (free block) of the common block group 602 and allocates the selected block to this QoS domain as a write destination block. Furthermore, the controller 4 determines a location (write destination location) in this write destination block. The write destination location in the write destination block is determined in consideration of restrictions on page write order, defective pages and the like. Subsequently, the controller 4 writes data from the host 2 to the write destination location in the write destination block.

If this write destination block is completely filled with user data, the controller 4 moves this write destination block to the active block list (active block pool) of this QoS domain. Subsequently, the controller 4 selects one block (free block) of the common block group 602 again and allocates the selected block to this QoS domain as a new write destination block.

The upper limit of the number of blocks allocatable to a certain QoS domain is limited to the number of blocks corresponding to the capacity of this QoS domain. When one block of the common block group 602 is allocated to this QoS domain, the controller 4 reduces the current number of blocks allocatable to this QoS domain by one. When a reuse command (or an erase command) designating one block of this QoS domain is received and this block is returned to the common block group 602, the controller 4 increases the current number of blocks allocatable to this QoS domain by one.

FIG. 8 illustrates the address record request transmitted from the flash storage device 3 to the host 2.

The address record request is used for notifying a physical address indicative of a storage location (physical storage location) in the NAND flash memory 5 in which write data associated with a write command is written to the host 2. The address record request may include a QoS domain ID, a tag, a physical address and a length.

The QoS domain ID is an identifier which can uniquely identify a QoS domain to which write data is written. The tag is the tag included in the write command illustrated in FIG. 7. The physical address indicates a physical storage location in which write data associated with a write command is written. The physical address is represented by a block address and an offset. The length indicates the length of written write data.

In some cases, a part of write data associated with one write command is written to an offset n of a current write destination block BLKm, and the remaining part of the write data is written to an offset 0 of a newly-allocated write destination block BLKx. In this case, the address record request includes a physical address (BLKm and offset n), a length L1 of data written to the BLKm, a physical address (BLKx and offset 0) and a length L2 of data written to the BLKx. In addition, the address record request may include two tags, that is, a tag (for example, an LBAj) which identifies data written to the BLKm and a tag (for example, an LBAk) which identifies data written to the BLKx. The LBAj is the tag (LBA) included in the write command. The LBAk may be a value obtained by adding the number of LBAs corresponding to the length L1 to the LBAj.

Based on the address record request received from the flash storage device 3, the host 2 can update the LUT such that a physical address (a block address and an offset) indicative of a storage location to which write data is written will be associated with the tag (for example, the LBA) of this write data.

For example, if an address record request indicative of QoS domain ID=#1, tag=LBA10, block address=BLK1, offset=0 and length=1, the host 2 updates the LUT corresponding to the QoS domain ID#1 such that the physical address (block address BLK1 and offset 0) will be associated with the LBA10.

In addition, for example, if an address record request indicative of QoS domain ID=#1, tag=LBA10, block address=BLK1, offset=0 and length=2, the host 2 updates the LUT corresponding to the QoS domain ID#1 such that the physical address (block address BLK1 and offset 0) will be associated with the LBA10 and the physical address (block address BLK1 and offset 1) will be associated with the LBA11.

In addition, the host 2 can manage valid/invalid management information for each block used in each QoS domain based on the content of the LUT corresponding to each QoS domain. The valid/invalid management information corresponding to a certain block indicates whether each data stored in this block is valid data or invalid data.

FIG. 9 illustrates the read command applied to the flash storage device 3.

The read command is a command which requests the flash storage device 3 to read data. This read command may include a command ID, a QoS domain ID, a physical address, a length and a read buffer address.

The command ID is an identifier unique to this command (this read command in this case). The QoS domain ID is an identifier which can uniquely identify a QoS domain in which data to be read is stored. The physical address indicates a physical location in which data to be read is stored. The physical address is represented by a block address and an offset. The block address is the block address of a read target block. The offset indicates the storage location of a read target in the read target block. The length indicates the length of data to be read. The read buffer address indicates a location in the host memory (read buffer of the host 2) to which the read data is to be transferred.

FIG. 10 illustrates the copy command applied to the flash storage device 3.

The copy command is a command which requests the flash storage device 3 to copy data already written in the NAND flash memory 5 to another storage location in the NAND flash memory 5. In the embodiment, two types of copy commands may be supported.

The copy command of FIG. 10 is the first type of copy command. The first type of copy command is used for copying each valid data included in a specific copy source block. The copy command of FIG. 10 may include a command ID, a source QoS domain ID, a source physical address and a destination QoS domain ID. In addition, this copy command may include a parameter designating the number of valid data to be copied, as a copy end condition.

The command ID is an identifier unique to this command (this first type of copy command). The source QoS domain ID is an identifier which identifies a copy source QoS domain. The source physical address indicates the block address of a copy source block in which data to be copied is stored. The destination QoS domain ID is an identifier which identifies a copy destination QoS domain. The copy destination QoS domain may be the same QoS domain as the copy source QoS domain or may be a different QoS domain from the copy source QoS domain.

When a copy command designating a certain destination QoS domain ID is received from the host 2, the controller 4 selects one block (free block) of the common block group 602 and allocates the selected block to the copy destination QoS domain corresponding to this destination QoS domain ID as a copy destination block. The controller 4 copies copy target data from the copy source block to the copy destination block.

The copy target data is determined based on map information notified from the host 2. This map information (valid map) indicates whether each data included in the copy source block is valid data or invalid data. The map information may be included in the copy command or may be transmitted to the flash storage device 3 from the host 2 separately from the copy command. The controller 4 copies each valid data in the copy source block to the copy destination block based this map information.

The controller 4 may repeatedly execute the data copy operation until the copying of each of all valid data from the copy source block to the copy destination block is completed. Alternatively, if this copy command includes a parameter designating the number of valid data to be copied, the controller 4 may end the data copy operation when the copying of the number of valid data designated by this parameter is completed.

If the copy destination block is completely filled with data, the controller 4 moves this copy destination block to the active block list (active block pool) of this destination QoS domain. Subsequently, the controller 4 selects one block (free block) of the common block group 602 again, and allocates the selected block to this destination QoS domain as a new copy destination block.

FIG. 11 illustrates a set valid map command.

The set valid map command is a command for notifying map information (valid map) to the flash storage device 3. The set valid map command may include a command ID, a source QoS domain ID, a source physical address and a bitmap.

The command ID is an identifier unique to this command (this set valid map command). The source QoS domain ID is an identifier which identifies a copy source QoS domain. The source physical address indicates the block address of a copy source block in which data to be copied is stored. The bitmap indicates whether each data included in the copy source block is a valid data or invalid data.

FIG. 12 illustrates an address change request transmitted from the flash storage device 3 to the host 2.

The address change request is used for notifying the new physical address of copied data to the host. That is, the address change request is used for notifying the identifier (tag) of copy target data, the block address of a copy destination block to which the copy target data is copied, an offset indicative of a location in the copy destination block to which the copy target data is copied, and the like, to the host 2.

This address change request may include an old QoS domain ID, a tag, an old physical address, a new QoS domain ID and a new physical address.

The old QoS domain ID is an identifier which identifies a copy source QoS domain. The tag is an identifier of copied data. If a plurality of data are copied, the address change request includes a plurality of tags corresponding to these data.

In the embodiment, the controller 4 can write both write data and the tag of the write data to a write destination block in the data write operation. Therefore, the controller 4 can copy both copy target data and the tag of the copy target data from a copy source block to a copy destination block in the data copy operation. The controller 4 can notify the tag, which is copied together with the copy target data from the copy source block to the copy destination block, to the host 2 as the tag of the copied data.

The old physical address indicates a copy source physical storage location in which copy target data is stored. The copy source physical storage location is represented by the block address of a copy source block and an offset indicative of a storage location in the copy source block in which copy target data is stored. If a plurality of data are copied, the address change request includes a plurality of old physical addresses corresponding to these data.

The new QoS domain ID is an identifier which identifies a copy destination QoS domain. The new physical address indicates a copy destination physical storage location to which copy target data is copied. The copy destination physical storage location is represented by the block address of a copy destination block and an offset indicative of a storage location in the copy destination block to which copy target data is copied. If a plurality of data are copied, the address change request includes a plurality of new physical addresses corresponding to these data.

FIG. 13 illustrates the second type of copy command designating the block address of a copy source block, an offset indicative of a storage location in the copy source block in which copy target data is stored, and the length of the copy target data. The second type of copy command does not use map information.

The second type of copy command may include a command ID, a source QoS domain ID, a source physical address, a length and a destination QoS domain ID.

The command ID is an identifier unique to this command (this second type of copy command). The source QoS domain ID is an identifier which identifies a copy source QoS domain. The source physical address is represented by the block address of a copy source block, and an offset indicative of a storage location in the copy source block in which copy target data to be copied is stored. The length indicates the length of copy target data. The destination QoS domain ID is an identifier which identifies a copy destination QoS domain. The copy destination QoS domain may be the same QoS domain as the copy source QoS domain or may be a different QoS domain from the copy source QoS domain.

Also when the second type of copy command designating a certain destination QoS domain ID is received from the host 2, the controller 4 selects one block (free block) of the common block group 602, and allocates the selected block to the copy destination QoS domain corresponding to this destination QoS domain ID as a copy destination block. If a copy destination block has already been allocated to this copy destination QoS domain, this process is not required. The copy destination block allocated to each copy destination QoS domain can be shared between the first type of copy command and the second type of copy command.

The controller 4 specifies copy target data in the copy source block based on the offset and the length designated by the second type of copy command, and copies the specified copy target data from the copy source block to the copy destination block of the copy destination QoS domain.

Note that, instead of the length, the second type of copy command may include a list of source physical addresses indicative of storage locations of a plurality of copy target data in a copy source block.

FIG. 14 illustrates the block address and the offset which define the physical address.

The block address designates a certain block BLK. Each block BLK includes a plurality of pages (page 0 to page n in this case) as illustrated in FIG. 14.

In a case where the page size (user data storage region of each page) is 16 Kbytes and if the grain is of the size of 4 KB, this block BLK is logically divided into 4×(n+1) areas.

An offset +0 indicates the first 4 KB area of page 0, an offset +1 indicates the second 4 KB area of page 0, an offset +2 indicates the third 4 KB area of page 0, and an offset +3 indicates the fourth 4 KB area of page 0.

An offset +4 indicates the first 4 KB area of page 1, an offset +5 indicates the second 4 KB area of page 1, an offset +6 indicates the third 4 KB area of page 1, and an offset +7 indicates the fourth 4 KB area of page 1.

FIG. 15 illustrates the relationship between the block address and the offset in a case where the super block is used.

To simplify the illustration, one super block SB#1 is assumed to be composed of four blocks BLK#11, BLK#21, BLK#31, and BLK#41. The block address (super block address) of the super block SB#1 is SB#1. Four blocks BLK#11, BLK#21, BLK#31 and BLK#41 may be blocks selected from four different NAND flash memory chips, respectively.

The controller 4 writes data in the order of page 0 of the block BLK#11, page 0 of the block BLK#21, page 0 of the block BLK#31, page 0 of the block BLK#41, page 1 of block the BLK#11, page 1 of the block BLK#21, page 1 of the block BLK#31, page 1 of the block BLK#41 and the like.

An offset +0 indicates the first 4 KB area of page 0 of the block BLK#11, an offset +1 indicates the second 4 KB area of page 0 of the block BLK#11, an offset +2 indicates the third 4 KB area of page 0 of the block BLK#11, and an offset +3 indicates the fourth 4 KB area of page 0 of the block BLK#11.

An offset +4 indicates the first 4 KB area of page 0 of the block BLK#21, an offset +5 indicates the second 4 KB area of page 0 of the block BLK#21, an offset +6 indicates the third 4 KB area of page 0 of the block BLK#21, and an offset +7 indicates the fourth 4 KB area of page 0 of the block BLK#21.

Similarly, an offset +12 indicates the first 4 KB area of page 0 of the block BLK#41, an offset +13 indicates the second 4 KB area of page 0 of the block BLK#41, an offset +14 indicates the third 4 KB area of page 0 of the block BLK#41, and an offset +15 indicates the fourth 4 KB area of page 0 of the block BLK#41.

An offset +16 indicates the first 4 KB area of page 1 of the block BLK#11, an offset +17 indicates the second 4 KB area of page 1 of the block BLK#11, an offset +18 indicates the third 4 KB area of page 1 of the block BLK#11, and an offset +19 indicates the fourth 4 KB area of page 1 of the block BLK#11.

An offset +20 indicates the first 4 KB area of page 1 of the block BLK#21, an offset +21 indicates the second 4 KB area of page 1 of the block BLK#21, an offset +22 indicates the third 4 KB area of page 1 of the block BLK#21, and an offset +23 indicates the fourth 4 KB area of page 1 of the block BLK#21.

Similarly, an offset +28 indicates the first 4 KB area of page 1 of the block BLK#41, an offset +29 indicates the second 4 KB area of page 1 of the block BLK#41, an offset +30 indicates the third 4 KB area of page 1 of the block BLK#41, and an offset +31 indicates the fourth 4 KB area of page 1 of the block BLK#41.

For example, if 4 Kbyte data corresponding to a write command designating a certain LBA (LBAx) is written to the location corresponding to the offset +8, the controller 4 may return the tag (=LBAx), the block number (=SB#1), the offset (=+8) and the length (=1) to the host 2 as the address record request to this write command.

FIG. 16 illustrates the QoS domains managed by the flash storage device 3.

FIG. 16 illustrates a case where a QoS domain #0, a QoS domain #2, . . . , and a QoS domain #n−1 are already created. In FIG. 16, these QoS domains are represented by squares. The vertical width of a square representing a certain QoS domain represents the capacity of this QoS domain.

A user application #0 can make a read/write access to the QoS domain #0 by using a read/write command including a QoS domain ID #0 of the QoS domain #0. Similarly, a user application #n−1 can make a read/write access to the QoS domain #n−1 by using a read/write command including a QoS domain ID #n−1 of the QoS domain #n−1.

The sequence chart of FIG. 17 illustrates the procedure of the QoS domain create process executed by the flash storage device 3.

When the controller 4 receives a QoS domain create command designating the QoS domain ID #0 from the host 2, the controller 4 creates the QoS domain #0 associated with the QoS domain ID #0 (step S11). In step S11, the controller 4 secures (reserves) the number of blocks corresponding to the capacity designated by this QoS domain create command for the block QoS domain #0 from the common block group 602. Subsequently, the controller 4 returns a response indicative of command completion to the host 2.

When the controller 4 receives a QoS domain create command designating the QoS domain ID #1 from the host 2, the controller 4 creates the QoS domain #1 associated with the QoS domain ID #1. In step S12, the controller 4 secures (reserves) the number of blocks corresponding to the capacity designated by this QoS domain create command for the QoS domain #1 from the common block group 602. Subsequently, the controller 4 returns a response indicative of command completion to the host 2.

Similarly, when the controller 4 receives a QoS domain create command designating the QoS domain ID #n−1 from the host 2, the controller 4 creates the QoS domain #n−1 associated with the QoS domain ID #n−1 (step S13). In step S13, the controller 4 secures (reserves) the number of blocks corresponding to the capacity designated by this QoS domain create command for the QoS domain #n−1 from the common block group 602. Subsequently, the controller 4 returns a response indicative of command completion to the host 2.

FIG. 18 illustrates the data write process executed by the host 2 and the flash storage device 3.

(1) In the host 2, a host FTL 701 is operated. This host FTL 701 manages mapping between each of tags such as LBAs and each of physical addresses of the flash storage device 3 by using a LUT. In response to a write request from a certain user application, the host FTL 701 transmits a write command designating the QoS domain ID of the QoS domain corresponding to this user application to the flash storage device 3. The host FTL 701 only needs to designate a QoS domain ID and does not need to designate a block to which data is to be written and a page to which data is to be written. For this reason, the host FTL 701 does not need to manage defective blocks, defective pages and the like in the flash storage device 3.

(2) The controller 4 of the flash storage device 3 selects one block of the common block group (free block group) 602 shared by the QoS domains 601. The controller 4 allocates the selected block as the write destination block for the QoS domain having the QoS domain ID designated by the received write command. In the common block group (free block group) 602, a group of only free blocks other than defective blocks may be managed. For example, a block having a minimum program/erase cycle count may be selected from the common block group 602. Subsequently, the controller 4 determines this write destination block as a block to which data is to be written, and further determines a write destination location in this write destination block to which data is to be written. As described above, if the write destination block for this QoS domain has already been allocated, the controller 4 only needs to determine the already-allocated write destination block as a block to which data is to be written, and does not need to execute the operation of allocating one block of the common block group 602 as the write destination block for this QoS domain.

(3) The controller 4 transmits a physical address record request including a block address indicative of the determined write destination block and an offset indicative of the determined write destination location to the host 2, and notifies a physical address to which write data associated with this write command is written to the host 2.

(4) The controller 4 retrieves write data from a write buffer 702 of the host 2 based on a write buffer address included in the write command. The retrieval of the write data from the write buffer 702 may be executed by DMA transfer. Subsequently, the controller 4 executes a data write operation of writing the write data to the write destination location in the write destination block.

(5) After the writing of the write data is completed and the write data becomes readable from the NAND flash memory 5, the controller 4 transmits a release request for releasing a region in the write buffer 702 in which this write data is stored. This release request may include the identifier of the write command corresponding to the write data whose writing is completed. Alternatively, this release request may include a write buffer address indicative of the storage location of this write data and the length of this write data. In response to this release request, the host 2 releases a region in the write buffer 702 in which this write data is stored. This released region in the write buffer 702 can be used for storing another write data, etc.

FIG. 19 illustrates the data read process executed by the host 2 and the flash storage device 3.

(1) When the host FTL 701 receives a read request from a certain user application, the host FTL 701 refers to the LUT in the host FTL 701 and retrieves the physical address corresponding to the tag such as the LBA designated by this read request. The host FTL 701 transmits a read command designating the QoS domain ID of the QoS domain corresponding to this user application, the retrieved physical address (block address and offset), a length and a read buffer address to the flash storage device 3.

(2) When the controller 4 receives this read command, the controller 4 reads data from the NAND flash memory 5 based on a block address and an offset which are designated by this read command. Subsequently, the controller 4 transfers this read data to a location in a read buffer 703 of the host 2 which is designated by the read buffer address, by using DMA transfer.

FIG. 20 illustrates the data copy process executed by the host 2 and the flash storage device 3. Here, the data copy process will be explained by taking the first type of copy command as an example.

(1) The host FTL 701 transmits a set valid map command to the flash storage device 3 and thereby notifies map information corresponding to a copy source block of a copy source QoS domain to the flash storage device 3.

(2) The host FTL 701 transmits a copy command including a source QoS domain ID, the block address of a copy source block of blocks belonging to the QoS domain having this source QoS domain ID, and a destination QoS domain ID to the flash storage device 3. Here, each of the source QoS domain ID and the destination QoS domain ID is assumed to be the QoS domain ID #0.

(3) The controller 4 of the flash storage device 3 selects one block of the common block group (free block group) 602 shared by the QoS domains 601, and allocates this selected block as the copy destination block for the QoS domain (the QoS domain #0 in this case) having the destination QoS domain ID (the QoS domain ID #0 in this case) designated by the received copy command. In the common block group (free block group) 602, a group of only free blocks other than defective blocks may be managed. For example, a block having a minimum program/erase count may be selected from the common block group 602. Subsequently, the controller 4 copies each valid data stored in the copy source block belonging to the QoS domain #0 to the copy destination block for the QoS domain #0 based on the map information. As described above, if the copy destination block for this QoS domain #0 has already been allocated, the controller 4 only needs to determine the already-allocated copy destination block as a block to which data is to be copied, and does not need to execute the operation of allocating one block of the common block group 602 as the copy destination block for this QoS domain #0.

(4) The controller 4 transmits an address change request to the host 2 and thereby notifies, for each copied valid data, information indicative of the identifier (tag) of the valid data, the block address of the copy destination block, and an offset indicative of a storage location in the copy destination block in which the valid data is stored to the host 2.

FIG. 21 illustrates the relationship between a plurality of QoS domains and a common flash block pool managed by the controller 4 of the flash storage device 3.

To simply the illustration, only two QoS domains, that is, the QoS domain #0 and the QoS domain #n−1 are illustrated in FIG. 21. A common flash block pool 801 is a list for managing the above-described common block group 602 shared by the QoS domains.

A flash block pool #0 of the QoS domain #0 is the above-described active block list for managing each active block belonging to the QoS domain #0. When the controller 4 receives a write command designating the QoS domain ID #0 of the QoS domain #0, the controller 4 determines whether the write destination block (open block) for the QoS domain #0 has already been allocated or not.

If the write destination block (open block) has not been allocated yet, the controller 4 allocates a free block in the common flash block pool 801 as the write destination block (open block) for the QoS domain #0. Subsequently, the controller 4 determines a write destination location in this write destination block, and writes write data associated with this write command to this write destination location in this write destination block.

On the other hand, if the write destination block (open block) has already been allocated, the controller 4 determines a write destination location in this write destination block, and writes write data associated with this write command to this write destination location in this write destination block.

When this write destination block is completely filled with data from the host, the controller 4 manages (closes) this write destination block by the flash block pool #0, and allocates a free block in the common flash block pool 801 as the new write destination block (open block) for the QoS domain #0.

When the controller 4 receives a copy command designating a copy source QoS domain indicative of the QoS domain ID #0, the block address of a copy source block, and a copy destination QoS domain indicative of the QoS domain ID #0, the controller 4 determines whether the copy destination block (open block) for the QoS domain #0 has already been allocated or not.

If the copy destination block (open block) has not been allocated yet, the controller 4 allocates a free block in the common flash block pool 801 as the copy destination block (open block) for the QoS domain #0. The controller 4 determines a copy destination location in the copy destination block. The controller 4 selects one block in the flash block pool #0 as a copy source block based on the block address of the copy source block. The controller 4 copies data in the selected copy source block to the copy destination location in the copy destination block. On the other hand, if the copy destination block has already been allocated, the controller 4 determines a copy destination location in the already-allocated copy destination block, and copies data in the selected copy source block to the copy destination location in the already-allocated copy destination block.

If the received copy command is the first type of copy command, the controller 4 copies each valid data in the selected copy source block to the copy destination block based on the above-described map information notified from the host 2.

If the copy destination block is completely filled with data from the host, the controller 4 manages (closes) this copy destination block by the flash block pool #0, and allocates a free block in the common flash block pool 801 as the new copy destination block (open block) for the QoS domain #0.

If all data in a block belonging to the QoS domain #0 become invalid data by writing of updated data or copying of data, the host 2 transmits a reuse command designating the block address of this block to the flash storage device 3.

When the controller 4 receives this reuse command from the host 2, the controller 4 returns the block in the flash block pool 0# designated by this reuse command and sets this block to a reusable state of being reusable as the new write destination block (or copy destination block) for any QoS domain.

If all data in a block belonging to the QoS domain #0 becomes invalid data by writing of updated data or copying of data, the host 2 may transmit an erase command designating the block address of this block to the flash storage device 3. When the controller 4 receives this erase command from the host 2, the controller 4 executes an erase operation on the block in the flash block pool #0 designated by this erase command, returns this block to the common flash block pool 801, and sets this block to a reusable state of being reusable as the new write destination block (or copy destination block) for any QoS domain.

Also in the QoS domain #n−1, the controller 4 allocates a write destination block/copy destination block, and executes a process of managing a write destination block/copy destination block filled with data by a flash block pool #n−1, a process of returning a block designated by a reuse command/erase command to the common flash block pool 801, and the like.

As described above, the write destination block for host write and the copy destination block for data copy are allocated to each QoS domain by the controller 4.

FIG. 22 illustrates the write destination block allocation operation executed by the controller 4 when the write destination block is completely filled with data during the execution of the write command.

A block BLK#1 is the write destination block currently allocated to the QoS domain #0. Here, to simplify the illustration, the block BLK #1 is assumed to be composed of four pages and the page size is assumed to be 16 KB.

It is assumed that a write command designating the QoS domain ID #0, a tag (LBAx) and a length (=16) is received from the host 2. On page 0 and page 1 of the write destination block BLK#1, data has already been written. The length (=16) represents that the size of write data associated with this write command is 64 Kbytes (=16×4 KB).

The controller 4 writes the first data portion which is a part of this write data (D1 to D16), that is, the first 32 KB data portion (D1 to D8) of this write data to page 2 and page 3 of the write destination block BLK#1. Consequently, the write destination block BLK#1 is completely filled with data.

The controller 4 allocates a new destination block BLK#2 to the QoS domain #0 from the common flash block pool 801. Subsequently, the controller 4 writes the second data portion which is the remaining part of the write data (D1 to D16), that is, the remaining 32 KB data portion (D9 to D16) of the write data to page 0 and page 1 of the write destination block BLK#2.

In this case, the address record request transmitted from the controller 4 to the host 2 includes the identifier of the first data portion of the write data, the identifier of the second data portion of the write data, and two physical addresses. One of the two physical addresses indicates block address=BLK#1 and offset=+8. The other of the two physical addresses indicates block address=BLK#2 and offset=+0.

More specifically, this address record request may include the following parameters.
  LBA=LBAx
  Block address=BLK#1
  Offset=+8
  Length=8
  LBA=LBAx+8
  Block address=BLK#2

Offset=+0
  Length=8

FIG. 23 illustrates the valid data copy operation executed based on the map information notified from the host 2.

Here, it is assumed that each valid data stored in a copy source block BLK#11 of the QoS domain #0 is copied to a copy destination block BLK#100 allocated to the QoS domain #0.

In the copy source block BLK#11, each of d1 to d3, d8 to d9, d11, d15 and d16 is valid data and each of d4 to d7, d10 and d12 to d14 is invalid data. In this case, the map information (bitmap) corresponding to the copy source block BLK#11 indicates "1110000110100011". While each bit "1" in the bitmap indicates that the data corresponding to this bit is valid data, each bit "0" in the bitmap indicates that the data corresponding to this bit is invalid data.

When the controller 4 receives the first type of copy command designating the copy source block BLK#11, the controller 4 copies four valid data (d1 to d3 and d8) to page 0 of the copy destination block BLK#100, and copies four valid data (d9, d11, d15 and d16) to page 1 of the copy destination block BLK#100. Subsequently, the controller 4 notifies the identifier of the data d1, the new physical address (BLK#100 and offset +0) of the data d1, the identifier of the data 2, the new physical address (BLK#100 and offset +1) of the data d2, the identifier of the data d3, the new physical address (BLK#100 and offset +2) of the data d3, the identifier of the data d8, the new physical address (BLK#100 and offset +3) of the data d8, the identifier of the data d9, the new physical address (BLK#100 and offset +4) of the data d9, the identifier of the data d11, the new physical address (BLK#100 and offset +5) of the data d11, the identifier of the data d15, the new physical address (BLK#100 and offset +6) of the data d15, the identifier of the data d16, the new physical address (BLK#100 and offset +7) of the data d16 and the like, to the host 2 as the address change request.

Figure 24:
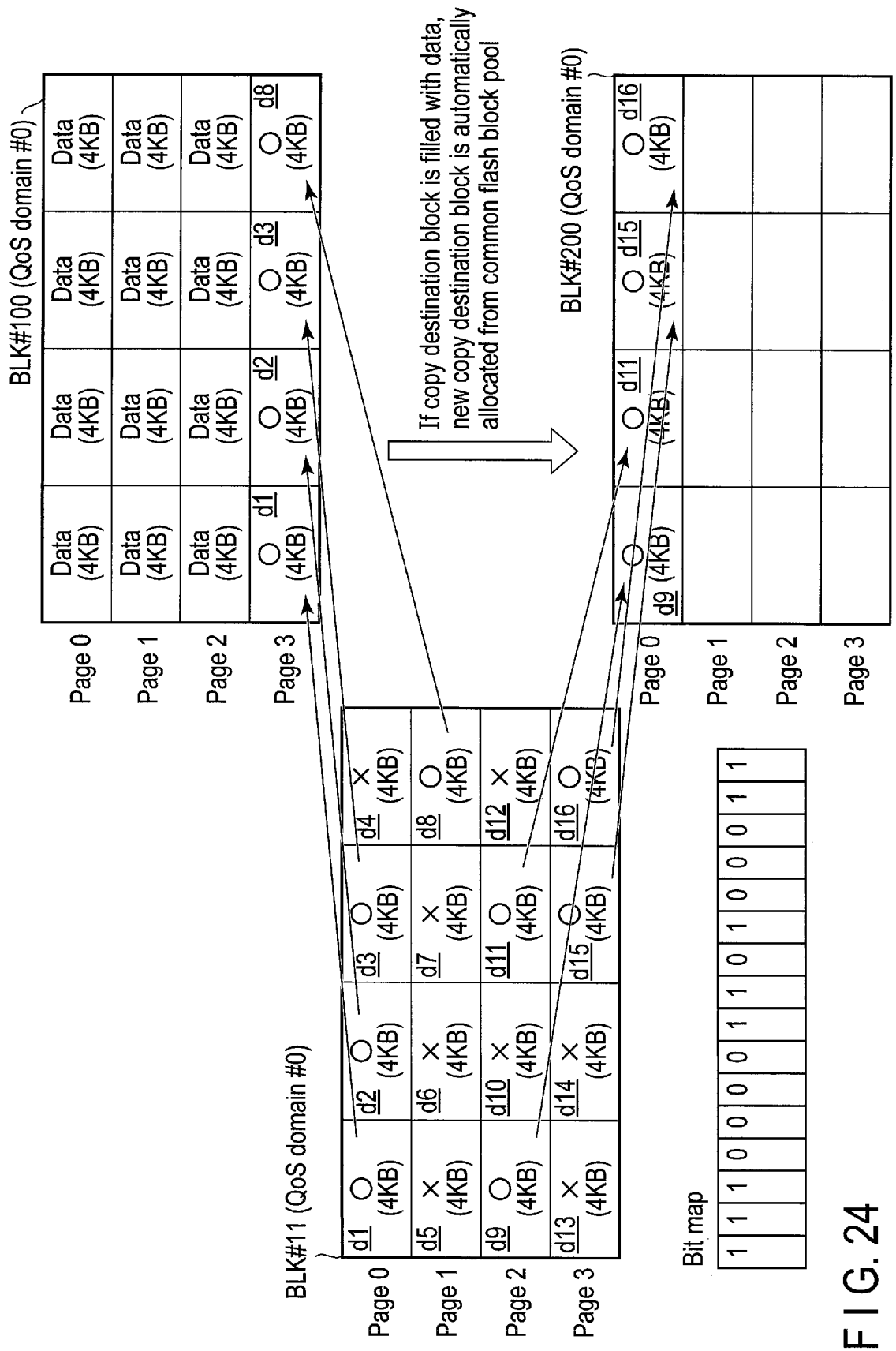
FIG. 24 is a diagram illustrating a copy destination block allocation operation executed by the memory system of the embodiment when a current copy destination block is filled with data by writing of a part of copy target data.

FIG. 24 illustrates the copy destination block allocation operation executed by the controller 4 when the copy destination block BLK#100 is completely filled with data during the extension of the copy command.

Here, it is assumed that the controller 4 receives the first type of copy command designating the copy source block BLK#11 from the host 2 in a state where data has already been copied to page 0 to page 2 of the copy destination block BLK#100 by the preceding copy command.

The controller 4 copies four valid data (d1 to d3 and d8) to page 3 of the copy destination block BLK#100. Consequently, the copy destination block BLK#100 becomes completely filled with data.

The controller 4 allocates a new copy destination block BLK#200 to the QoS domain #0 from the common flash block pool 801. The controller 4 then copies the remaining four valid data (d9, d11, d15 and d16) to page 0 of the copy destination block BLK#200.

Subsequently, the controller 4 notifies the identifier of the data d1, the new physical address (BLK#100 and offset +12) of the data d1, the identifier of the data 2, the new physical address (BLK#100 and offset +13) of the data d2, the identifier of the data d3, the new physical address (BLK#100 and offset +14) of the data d3, the identifier of the data d8, the new physical address (BLK#100 and offset +15) of the data d8, the identifier of the data d9, the new physical address (BLK#200 and offset +0) of the data d9, the identifier of the data d11, the new physical address (BLK#200 and offset +1) of the data d11, the identifier of the data d15, the new physical address (BLK#200 and offset +2) of the data d15, the identifier of the data d16, the new physical address (BLK#200 and offset +3) of the data d16, and the like, to the host 2 as the address change request.

Figure 25:
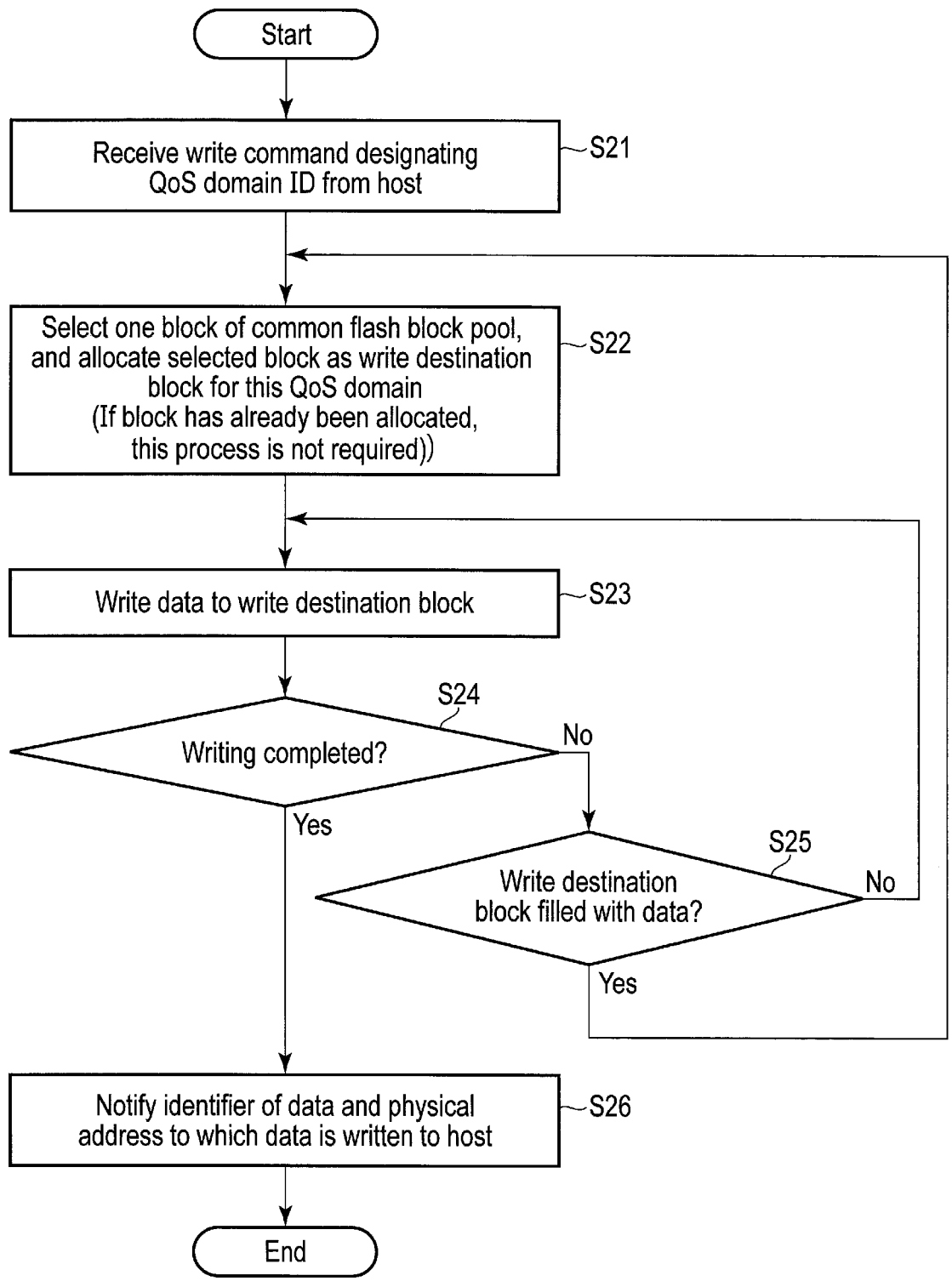
FIG. 25 is a flowchart illustrating the procedure of the write destination block allocation operation and the data write operation executed by the memory system of the embodiment.

The flowchart of FIG. 25 illustrates the procedure of the write destination block allocation operation and the data write operation.

The controller 4 receives a write command from the host 2 (step S21). This write command designates one of the QoS domains ID for accessing the created QoS domains. The controller 4 selects one block (free block) in the common flash block pool 801 shared by the QoS domains. Subsequently, the controller 4 allocates the selected block as the write destination block for the QoS domain corresponding to the QoS domain ID designated by the received write command (step S22). As described above, if the write destination block for this QoS domain has already been allocated, this allocation operation is not required.

The controller 4 determines a write destination location in this write destination block, and writes write data associated with the received write command to this write destination location in this write destination block (step S23).

If the write destination block is completely filled with data by writing of a part of the write data associated with the received write command (NO of step S24 and YES of step S25), the controller 4 selects one block (free block) in the common flash block pool 801, and allocates the selected block as the new write destination block for this QoS domain (step S22). Subsequently, the controller 4 determines a write destination location (usually the first page) in this new write destination block, and writes the remaining part of this write data to this write destination location in this new write destination block (step S23).

If the writing of the whole write data is completed (YES of step S24), the controller 4 notifies the identifier (for example, LBA) of this write data and a physical address (block address and offset) to which this write data is written to the host 2 as an address record request (step S26).

If write data is written over two write destination blocks, that is, if the first data portion, which is a part of the write data, is written to the first write destination block and the second data portion, which is the remaining part of the write data, is written to the second write destination block, the controller 4 notifies the tag of the first data portion, a physical address to which the first data portion is written (the block address of the first write destination block and an offset indicative of a storage location in the first write destination block to which the first data portion is written), the tag of the second data portion, and a physical address to which the second data portion is written (the block address of the second write destination block and an offset indicative of a storage location in the second write destination block to which the second data portion is written) to the host 2 as an address record request (step S26). If the tag of the write data is LBAx, the LBA of the first data portion may be LBAx and the LBA of the second data portion may be LBA obtained by adding the number of LBAs corresponding to the length of the first data portion to LBAx.

The flowchart of FIG. 26 illustrates the procedure of the copy destination block allocation operation and the data copy operation.

The controller 4 receives a copy command from the host 2 (step S31). This copy command designates the block address of a copy source block and the identifier of a copy destination target QoS domain indicative of one QoS domain ID. The identifier of the copy destination target QoS domain is a destination QoS domain ID. More specifically, this copy command designates a source QoS domain ID, a source physical address (the block address of a copy source block) and a destination QoS domain ID.

The controller 4 selects one block (free block) in the common flash block pool 801 shared by the QoS domains. Subsequently, the controller 4 allocates the selected block as the copy destination block for the destination QoS domain corresponding to the destination QoS domain ID designated by the received copy command (step S32). As described above, if the copy destination block for this destination QoS domain has already been allocated, this allocation operation is not required.

The controller 4 determines a copy destination location in this copy destination block, and copies data (copy target data) in the copy source block designated by the received copy command to this copy destination location in this copy destination block (step S33). If the received copy command is the first type of copy command, each valid data designated by map information is determined as copy target data in the copy source block. If the received copy command is the second type of copy command, copy target data in the copy source block is determined based on an offset included in the source physical address designated by the second type of copy command and a length designated by the second type of copy command.

If the copy destination block of the destination QoS domain is completely filled with data by copying of a part of the copy target data (NO of step S34 and YES of step S35), the controller 4 selects one block (free block) in the common flash block pool 801, and allocates the selected block as the new copy destination block for this destination QoS domain (step S32). Subsequently, the controller 4 determines a copy destination location (usually the first page) in this new copy destination block, and copies the remaining part of this copy target data to this copy destination location in this new copy destination block (step S33).

If the copying of the whole copy target data is completed (YES of step S34), the controller 4 notifies the identifier (for example, LBA) of this copy target data and a new physical address (block address and offset) to which this copy target data is copied to the host 2 (step S36).

If copy target data is copied over two copy destination blocks, that is, if the third data portion, which is a part of the copy target data, is copied to the first copy destination block and the fourth portion, which is the remaining part of the copy target data, is copied to the second copy destination block, the controller 4 notifies the tag of the third data portion, a physical address to which the third data portion is copied (the block address of the first copy destination block and an offset indicative of a storage location in the first copy destination block to which the third data portion is copied), the tag of the fourth data portion, and a physical address to which the fourth data portion is copied (the block address of the second copy destination block and an offset indicative of a storage location in the second copy destination block to which the fourth data portion is copied) to the host 2 as an address change request (step S36).

As described above, according to the embodiment, a plurality of write destination blocks corresponding respectively to a plurality of QoS domains are allocated. Subsequently, write data associated with a write command designating a certain QoS domain ID is written to the write destination block for the QoS domain corresponding to this QoS domain ID. In addition, write data associated with a write command designating other QoS domain ID is written to the write destination block for the QoS domain corresponding to the other QoS domain ID. Consequently, write data from different user applications can be written to different write destination blocks without the control of data placement by the host 2. As a result, the burden on the host 2 side for data placement, that is, for writing write data from a plurality of user applications to different blocks can be reduced.

In addition, for each QoS domain, a block different from a write destination block is allocated as a copy destination block. As a result, it is possible to realize such data placement that a write destination block to which data is to be written from the host 2 and a copy destination block to which data already written in the NAND flash memory 5 is to be copied will be isolated from each other without the control of the host 2.

In the embodiment, a NAND flash memory has been taken as an example of the nonvolatile memory. However, the functions of the embodiment are also applicable to various other nonvolatile memories such as a magnetoresistive random access memory (MRAM), a phase change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the memory system comprising:
a nonvolatile memory including a plurality of blocks; and
a controller electrically connected to the nonvolatile memory and configured to control the nonvolatile memory, wherein the controller is configured to:
create a plurality of regions, each of which is a subset of the plurality of blocks, respectively in response to region create commands received from the host;
allocate, when receiving a copy command including a block address of a copy source block of blocks belonging to a region corresponding to a first identifier, and a second identifier, one block of a common free block group shared by the plurality of regions as a first copy destination block for a copy destination target region of the plurality of regions, wherein the first identifier being an identifier of a plurality of identifiers for accessing the plurality of regions, the second identifier being an identifier of the copy destination target region, the copy command does not include a block address of a copy destination block of blocks belonging to the copy destination target region corresponding to the second identifier; and
copy target data from the copy source block to the first copy destination block, and notify, as an address change request, the host of (i) an identifier of the target data, (ii) the second identifier, (iii) a block address of the first copy destination block, and (iv) an offset indicative of a location in the first copy destination block to which the target data is copied.

2. The memory system of claim 1, wherein
the controller is configured to:
when the first copy destination block is filled with data by copying of a first data portion which is a part of the target data in the copy source block,
allocate one block of the common free block group as a second copy destination block for the copy destination target region; and
copy a second data portion which is a remaining part of the target data to the second copy destination block.

3. The memory system of claim 2, wherein
the controller is configured to notify, as the address change request, the host of an identifier of the first data portion, the second identifier, the block address of the first copy destination block, an offset indicative of a storage location in the first copy destination block to which the first data portion is copied, an identifier of the second data portion of the target data, a block address of the second copy destination block, and an offset indicative of a storage location in the second copy destination block to which the second data portion is copied.

4. The memory system of claim 1, wherein
each of the plurality of blocks belongs to one of the plurality of regions, and the same block does not simultaneously belong to different regions of the plurality of regions.

5. The memory system of claim 1, wherein
the controller is configured to:
when the copy command is a first type of copy command for copying each valid data included in the copy source block,
copy each valid data included in the copy source block to the first copy destination block based on map information notified from the host which indicates whether each data included in the copy source block is valid data or invalid data; and
notify, for each copied valid data, information indicative of an identifier of the valid data, the block address of the first copy destination block, and an offset indicative of a storage location in the first copy destination block to which the valid data is copied to the host as the address change request.

6. The memory system of claim 1, wherein
the controller is configured to:
when the copy command is a second type of copy command designating the block address of the copy source block, an offset indicative of a storage location in the copy source block in which the target data is stored, and a length of the target data,
copy the target data from the copy source block to the first copy destination block based on the offset and the length designated by the second type of copy command.

7. The memory system of claim 1, wherein
the controller is configured to:
allocate, when receiving a write command including a third identifier of the plurality of identifiers and an identifier of first data from the host, one block of the common free block group as a first write destination block for the region corresponding to the third identifier, wherein the write command does not include a block address of a write destination block to which the first data is to be written; and
write the first data associated with the write command to the first write destination block, and notify, as an address record request, the host of (i) the identifier of the first data, (ii) a block address of the first write destination block, and (iii) an offset indicative of a storage location in the first write destination block to which the first data is written.

8. The memory system of claim 7, wherein the controller is configured to:
when the first write destination block is filled with data by writing of a third data portion which is a part of the first data,
allocate one block of the common free block group as a second write destination block for the region corresponding to the third identifier; and
write a fourth data portion which is a remaining part of the first data to the second write destination block.

9. The memory system of claim 8, wherein the controller is configured to notify an identifier of the third data portion of the first data, the block address of the first write destination block, an offset indicative of a storage location in the first write destination block to which the third data portion is written, an identifier of the fourth data portion of the first data, a block address of the second write destination block, and an offset indicative of a storage location in the second write destination block to which the fourth data portion is written to the host as the address record request.

10. A method of controlling a nonvolatile memory including a plurality of blocks, the method comprising:
creating a plurality of regions, each of which is a subset of the plurality of blocks, respectively in response to region create commands received from a host;
allocating, when receiving a copy command including a block address of a copy source block of blocks belonging to a region corresponding to a first identifier, and a second identifier, one block of a common free block group shared by the plurality of regions as a first copy destination block for a copy destination target region of the plurality of regions, wherein the first identifier being an identifier of a plurality of identifiers for accessing the plurality of regions, the second identifier being an identifier of the copy destination target region, the copy command does not include a block address of a copy destination block of blocks belonging to the copy destination target region corresponding to the second identifier;
copying target data from the copy source block to the first copy destination block; and
notifying, as an address change request, the host of (i) an identifier of the target data, (ii) the second identifier, (iii) a block address of the first copy destination block, and (iv) an offset indicative of a location in the first copy destination block to which the target data is copied.

11. The method of claim 10, further comprising:
allocating one block of the common free block group as a second copy destination block for the copy destination target region when the first copy destination block is filled with data by copying of a first data portion which is a part of the target data in the copy source block; and
copying a second data portion which is a remaining part of the target data to the second copy destination block.

12. The method of claim 11, further comprising:
notifying, as the address change request, the host of an identifier of the first data portion, the second identifier, the block address of the first copy destination block, an offset indicative of a storage location in the first copy destination block to which the first data portion is copied, an identifier of the second data portion of the target data, a block address of the second copy destination block, and an offset indicative of a storage location in the second copy destination block to which the second data portion is copied.

13. The method of claim 10, wherein
each of the plurality of blocks belongs to one of the plurality of regions, and the same block does not simultaneously belong to different regions of the plurality of regions.

14. The method of claim 10, wherein
when the copy command is a first type of copy command for copying each valid data included in the copy source block,
the copying includes copying each valid data included in the copy source block to the first copy destination block based on map information notified from the host which indicates whether each data included in the copy source block is valid data or invalid data; and
the notifying includes notifying, for each copied valid data, information indicative of an identifier of the valid data, the block address of the first copy destination block, and an offset indicative of a storage location in the first copy destination block to which the valid data is copied to the host as the address change request.

15. The method of claim 10, wherein
when the copy command is a second type of copy command designating the block address of the copy source block, an offset indicative of a storage location in the copy source block in which the target data is stored, and a length of the target data,
the copying includes copying the target data from the copy source block to the first copy destination block based on the offset and the length designated by the second type of copy command.

16. The method of claim 10, further comprising:
allocating, when receiving a write command including a third identifier of the plurality of identifiers and an identifier of first data from the host, one block of the common free block group as a first write destination block for the region corresponding to the third identifier, wherein the write command does not include a block address of a write destination block to which the first data is to be written;
writing the first data associated with the write command to the first write destination block; and
notifying, as an address record request, the host of (i) the identifier of the first data, (ii) a block address of the first write destination block, and (iii) an offset indicative of a storage location in the first write destination block to which the first data is written.

17. The method of claim 16, further comprising:
allocate one block of the common free block group as a second write destination block for the region corresponding to the third identifier when the first write destination block is filled with data by writing of a third data portion which is a part of the first data; and
writing a fourth data portion which is a remaining part of the first data to the second write destination block.

18. The method of claim 17, further comprising:
notifying an identifier of the third data portion of the first data, the block address of the first write destination block, an offset indicative of a storage location in the first write destination block to which the third data portion is written, an identifier of the fourth data portion of the first data, a block address of the second write destination block, and an offset indicative of a storage location in the second write destination block to which the fourth data portion is written to the host as the address record request.

\* \* \* \* \*